US011057910B2

(12) United States Patent
Khoryaev et al.

(10) Patent No.: US 11,057,910 B2
(45) Date of Patent: Jul. 6, 2021

(54) RESOURCE ACCESS IN DEVICE TO DEVICE COMMUNICATION

(71) Applicant: Apple Inc., Cupertino, CA (US)

(72) Inventors: Alexey Khoryaev, Nizhny Novgorod (RU); Sergey Panteleev, Nizhny Novgorod (RU); Richard Burbidge, Shrivenham (GB); Youn Hyoung Heo, San Jose, CA (US); Kyeongin Jeong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/515,519

(22) Filed: Jul. 18, 2019

(65) Prior Publication Data

US 2020/0015255 A1 Jan. 9, 2020

Related U.S. Application Data

(63) Continuation of application No. 15/743,548, filed as application No. PCT/US2015/000294 on Dec. 23, 2015, now Pat. No. 10,412,754.

(Continued)

(51) Int. Cl.
*H04W 72/12* (2009.01)
*H04W 72/02* (2009.01)
(Continued)

(52) U.S. Cl.
CPC ....... *H04W 72/1263* (2013.01); *H04W 72/02* (2013.01); *H04W 72/10* (2013.01);
(Continued)

(58) Field of Classification Search
CPC ......... H04W 72/1289; H04W 72/1284; H04W 72/1263; H04W 72/10; H04W 74/08;
(Continued)

(56) References Cited

U.S. PATENT DOCUMENTS 9,788,186 B2 * 10/2017 Chatterjee ............. H04W 48/12
9,847,848 B2 * 12/2017 Ryu ......................... H04L 1/00
(Continued)

FOREIGN PATENT DOCUMENTS

WO 20150178851 A1 11/2015

OTHER PUBLICATIONS

International Search Report and Written Opinion for International Patent Application No. PCT/US2015/000294 dated Apr. 26, 2016; 16 pages.
(Continued)

*Primary Examiner* — Man U Phan
(74) *Attorney, Agent, or Firm* — Fish & Richardson P.C.

(57) ABSTRACT

A wireless communication device is configured to perform resource access in device-to-device (D2D) communication. A user equipment (UE) is provided with processing hardware comprising application processing circuitry and baseband processing circuitry. The application processing circuitry assigns a per-packet priority to data packets in the application layer. The baseband processing circuitry maps the per-packet priority to a transmission priority in the physical layer and prioritizes access to a wireless resource pool depending upon the transmission priority. A UE having the application processing circuitry and baseband processing circuitry is also provided. A computer program product is also provided. An evolved Node B (eNodeB) allocates a resource quota to a UE based upon priority information from the UE corresponding to a D2D communication to be transmitted by the UE. Other embodiments may be described and claimed.

20 Claims, 20 Drawing Sheets

Related U.S. Application Data

(60) Provisional application No. 62/204,298, filed on Aug. 12, 2015.

(51) Int. Cl.
  *H04W 72/10* (2009.01)
  *H04W 74/08* (2009.01)

(52) U.S. Cl.
  CPC ... *H04W 72/1242* (2013.01); *H04W 72/1284* (2013.01); *H04W 72/1289* (2013.01); *H04W 74/08* (2013.01)

(58) Field of Classification Search
  CPC .. H04W 72/1242; H04W 72/02; H04W 72/12
  USPC .......................................................... 370/329
  See application file for complete search history.

(56) References Cited

U.S. PATENT DOCUMENTS

| | | | |
|---|---|---|---|
| 10,039,119 B2* | 7/2018 | Sorrentino | H04W 74/0808 |
| 10,154,402 B2* | 12/2018 | Agiwal | H04W 4/08 |
| 10,412,754 B2 | 9/2019 | Khoryaev et al. | |
| 2016/0381491 A1* | 12/2016 | Watfa | H04W 72/005 |
| | | | 455/41.2 |
| 2017/0048903 A1* | 2/2017 | Yi | H04W 4/70 |
| 2017/0118671 A1 | 4/2017 | Lee et al. | |
| 2017/0245292 A1* | 8/2017 | Agiwal | H04W 28/02 |
| 2017/0245295 A1* | 8/2017 | Jung | H04W 72/10 |
| 2017/0359835 A1* | 12/2017 | Seo | H04W 72/14 |
| 2018/0077552 A1* | 3/2018 | Lee | H04W 72/12 |
| 2018/0132254 A1* | 5/2018 | Chae | H04W 76/14 |
| 2018/0199229 A1* | 7/2018 | Lee | H04W 76/14 |
| 2018/0206260 A1 | 7/2018 | Khoryaev et al. | |

OTHER PUBLICATIONS

Alcatel-Lucent, et al.; "D2D Resource Pool Configuration," Agenda Item: 7.2.1.2.1 3GPP TSG RAN WG1 Meeting #78bis, R1-144066; Ljubljana, Slovenia, Oct. 6-10, 2014; 4 pages.

Ericsson; "Considerations on ProSe group priority," Agenda Item: 7.2.3.2.2, 3GPP TSG-RAN WG1 Meeting #80bis, R1-151763; Belgrade, Serbia, Apr. 20-24, 2015; 2 pages.

Interdigital Communications; "Priority handling for D2D communications," Agenda Item: 6.2.3.3, 3GPP TSG-RAN WG1 Meeting #81, R1-153374; Fukuoka, Japan, May 25-29, 2015; 6 pages.

Alcatel-Lucent, et al.; "Priority handling for ProSE Communication," Agenda Item: 7.5.5, 3GPP TSG-RAN WG2 Meeting #89bis, R2-151459; Bratislava, Slovakia, Apr. 20-24, 2015; 5 pages.

ETRI; "Resource pool handling for priority support," Agenda Item: 7.5.4, 3GPP TSG RAN WG2 #90, R2-152422; Fukuoka, Japan, May 25-29, 2015; 2 pages.

Qualcomm Incorporated; "Priority handling for Sidelink Direct Communication," Agenda Item: 7.5.4, 3GPP TSG-RAN WG2 Meeting #90, R2-152575; Fukuoka, Japan, May 25-29, 2015; 2 pages.

3GPP TS 36.211 V12.6.0 (Jun. 2015); "Technical Specification Group Radio Access Network; Evolved Universal Terrestrial Radio Access (E-UTRA); Physical channels and modulation (Release 12)," 136 pages.

European Patent Office; Office Action issued for Patent Application No. 15826207.1 dated Mar. 4, 2019; 6 pages.

EP Extended Search Report and Written Opinion in European Appln. 120187915.2, dated Oct. 14, 2020, 19 pages.

PCT International Preliminary Report on Patentability in PCT Appln. No. PCT/US2015/000294, dated Feb. 13, 2018, 10 pages.

3GPP, "Technical Specification Group Services and System Aspects; Proximity-based services (ProSe); Stage 2 (Release 13)," 3GPP TS 23.303 V13.0.0 (Jun. 2015), Lie Advanced, 97 pages.

* cited by examiner

RESOURCE ACCESS IN DEVICE TO DEVICE COMMUNICATION

CROSS REFERENCE TO RELATED APPLICATIONS

The present application is a continuation of U.S. patent application Ser. No. 15/743,548, filed Jan. 10, 2018, entitled "RESOURCE ACCESS IN DEVICE TO DEVICE COMMUNICATION," now U.S. Pat. No. 10,412,754, issued Sep. 10, 2019, which is a national phase entry under 35 U.S.C. § 371 of International Application No. PCT/US2015/000294, filed Dec. 23, 2015, entitled "RESOURCE ACCESS IN DEVICE TO DEVICE COMMUNICATION," which claims priority to U.S. Provisional Patent Application No. 62/204,298, filed Aug. 12, 2015, entitled "METHODS TO SUPPORT PRIORITIZED RESOURCE ACCESS IN LTE D2D", the entire disclosures of which are hereby incorporated by reference in their entireties.

TECHNICAL FIELD

Embodiments described herein generally relate to the field of wireless communications, and more particularly, to the third generation partnership project (3GPP) Long Term Evolution (LTE) and LTE-Advanced (LTE-A) device-to-device (D2D), or equivalently, Proximity Services (ProSe) communication in wireless communication networks.

BACKGROUND

A ProSe feature specified by 3GPP Technical Specification (TS) 23.303, July 2015 allows for ProSe Direct Discovery and ProSe Direct Communication, which enable user equipments (UEs) to discover and communicate with each other directly rather than routing data via an evolved Node B (eNodeB). This can offer high data rates and low end-to-end delays as a result of the short range direct communication. D2D also allows for range-extension via UE-to-UE relaying. In this specification D2D and ProSe can be used interchangeably. A direct radio link between two or more UEs is known as a "sidelink" (see 3GPP TS 36.211), to distinguish it from conventional uplink (UL) and downlink (DL) connections between UE and eNodeB. Sidelink (SL) communications use a subset of the LTE/LTE-A UL time-frequency resources and use Single Carrier-Frequency Division Multiple Access (SC-FDMA), i.e., the same transmission scheme as LTE/LTE-A uplink transmissions. The relevant SL channels comprise: Physical Sidelink Control Channel (PSCCH) for SL control information; Physical Sidelink Shared Channel (PSSCH) for SL data; Physical Sidelink Discovery Channel (PSDCH) for discovery announcements and Physical Sidelink Broadcast Channel (PSBCH) for broadcast of D2D system information to assist D2D synchronization.

It is desirable to be able to efficiently allocate available wireless network resources and to appropriately manage contention for network resources. It is known to use Quality-of-service Class Identifiers (QCIs) in LTE/LTE-A UL and DL communications to indicate packet priority and these QCIs are assigned between a UE and an Evolved Packet Core (EPC) via System Architecture Evolution (SAE) bearers at a Packet Data Convergence Protocol (PDCP) protocol layer. There is an aim to enable priority support for D2D or ProSe communication to prioritize access to available radio resources according to, for example, traffic characteristics. One application of D2D communication is in implementing LTE-based public safety networks, in which it will be appreciated that there is likely to be an aim for more important network traffic to be prioritized over less important network traffic. The more important traffic can be, for example, a voice of a firefighters' commander which can have a higher priority than voice data of the lower-ranking firefighters. Compared to commercial networks, public safety networks can have more stringent target service criteria for reliability and security and are likely to implement D2D communication, for example, when wireless cellular coverage fails or is not available. However, prioritization of network resources is also desirable in commercial networks to allow prioritization of traffic for different services like voice, video and data. Thus there is a desire to provide priority handling support for SL communication.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

Illustrative embodiments of the present disclosure include, but are not limited to, methods, systems, apparatuses and computer programs for performing wireless D2D or ProSe communication.

Figure 1:
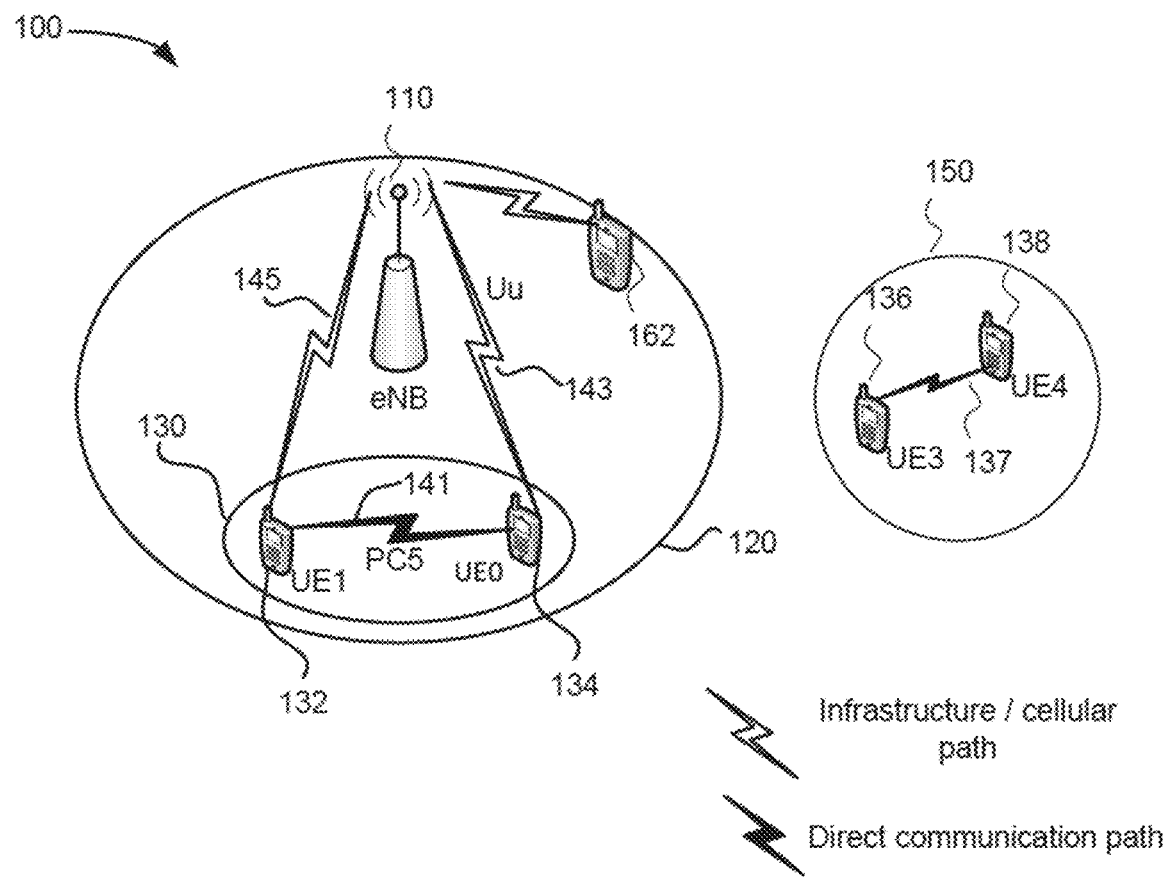
FIG. 1 schematically illustrates a wireless communication network implementing D2D communication.

FIG. 1 schematically illustrates a wireless communication network implementing D2D communication both in and out of cellular wireless network coverage. A first D2D cluster 130 comprises a first UE 132 and a second UE 134, which are each within network coverage because they are both located in a cell 120 associated with the eNodeB 110. A cluster may include more than two UEs. A direct communication path 141 exists between the first UE 132 and the second UE 134, allowing data to pass between a transmitting UE and a receiving UE without being routed via the eNodeB 110. However, in this embodiment, control of the D2D data path, PC5 141, is performed via the eNodeB 110 using cellular communication paths 143 and 145. Thus data passes directly between the transmitting and receiving UEs 132, 134 whereas control of the D2D link is performed via the eNodeB 110. This is referred to as "mode 1" SL communication. The eNodeB 110 performs setup control, radio bearer control and resource control of the D2D data path 141. The eNodeB 110 assigns resources for D2D communication in PSCCH and PSSCH. A third UE 162 has a conventional LTE uplink/downlink connection with the eNodeB 110.

The D2D cluster 130 corresponds to an in-coverage D2D communication scenario, where at least one of the UE 132 or the UE 134 has connectivity to the wireless cellular infrastructure via the eNodeB 110 for control of the D2D communications. For the in-coverage D2D cluster 130, cellular spectrum (e.g. LTE or LTE-A spectrum) can be used for both the D2D path 141 and the cellular links 143, 145. In some embodiments, communication may be configured in "underlay" mode, where D2D links and cellular links dynamically share the same radio resources and in other embodiments in "overlay" mode may be used, where D2D communication links are allocated dedicated cellular wireless resources. In overlay mode, "resource pools" of the LTE/LTE-A uplink spectrum are allocated for use in D2D communications. For example, physical resource blocks of uplink spectrum can be periodically allocated to the PSCCH and/or physical resource blocks of the Physical Uplink Shared Channel (PUSCH) can be periodically allocated to the PSSCH.

A second D2D cluster 150 comprising a third UE 136 and a fourth UE 138 corresponds to an out-of-coverage D2D cluster performing "mode 2" or "autonomous" SL transmission, in which neither of the UEs 136, 138 is able to form a connection with an eNodeB of the wireless cellular infrastructure. In this out-of-coverage D2D communication cluster 150, the UEs themselves can be configured to perform peer discovery, resource allocation interference management and power control without network support. Note that "mode 2" D2D transmission can, at least in principle, be performed by UEs that are in-coverage as well as those which are out of coverage. For mode 2, the UE selects transmission resource from predefined resource pools for both PSCCH and PSSCH whereas in mode 1 an eNodeB assigns transmission resources.

In the first D2D cluster 130, which is in-coverage, the two UEs 132, 134 of the cluster pair may have radio resources for their respective D2D transmissions allocated by the eNodeB 110 and they may also achieve frequency synchronization as well as sub-frame, slot and symbol synchronization in the time domain via the eNodeB. However, the out-of coverage UEs 136, 138 of the second cluster 150 will have to achieve frequency and timing synchronization in some other way and they will also have to manage D2D transmission scheduling and contention for physical resources.

Setting up D2D communication may be considered to include two stages: firstly proximity discovery, and secondly, initialization and initiation of the D2D communication. Proximity discovery may be achieved, for example, based on positioning information using e.g., Global Positioning Satellite (GPS) or Assisted-GPS information. The second stage includes allocation of network resources (e.g. bandwidth) to the D2D communication. In some cases, D2D communication may be performed without proximity discovery.

Most D2D schemes can be classified as belonging to one of two types, termed normal (commercial) D2D and public safety D2D. Some devices may be arranged to operate according to both schemes, while other devices may be arranged to operate according to only one of these schemes. The present technique is applicable to both commercial and public safety D2D communications and to D2D communications both where the communicating UEs are in-coverage and out-of-coverage of the wireless cellular network. The present technique is also applicable to cluster-head configuration where not all UEs of the cluster are in-coverage.

Figure 2:
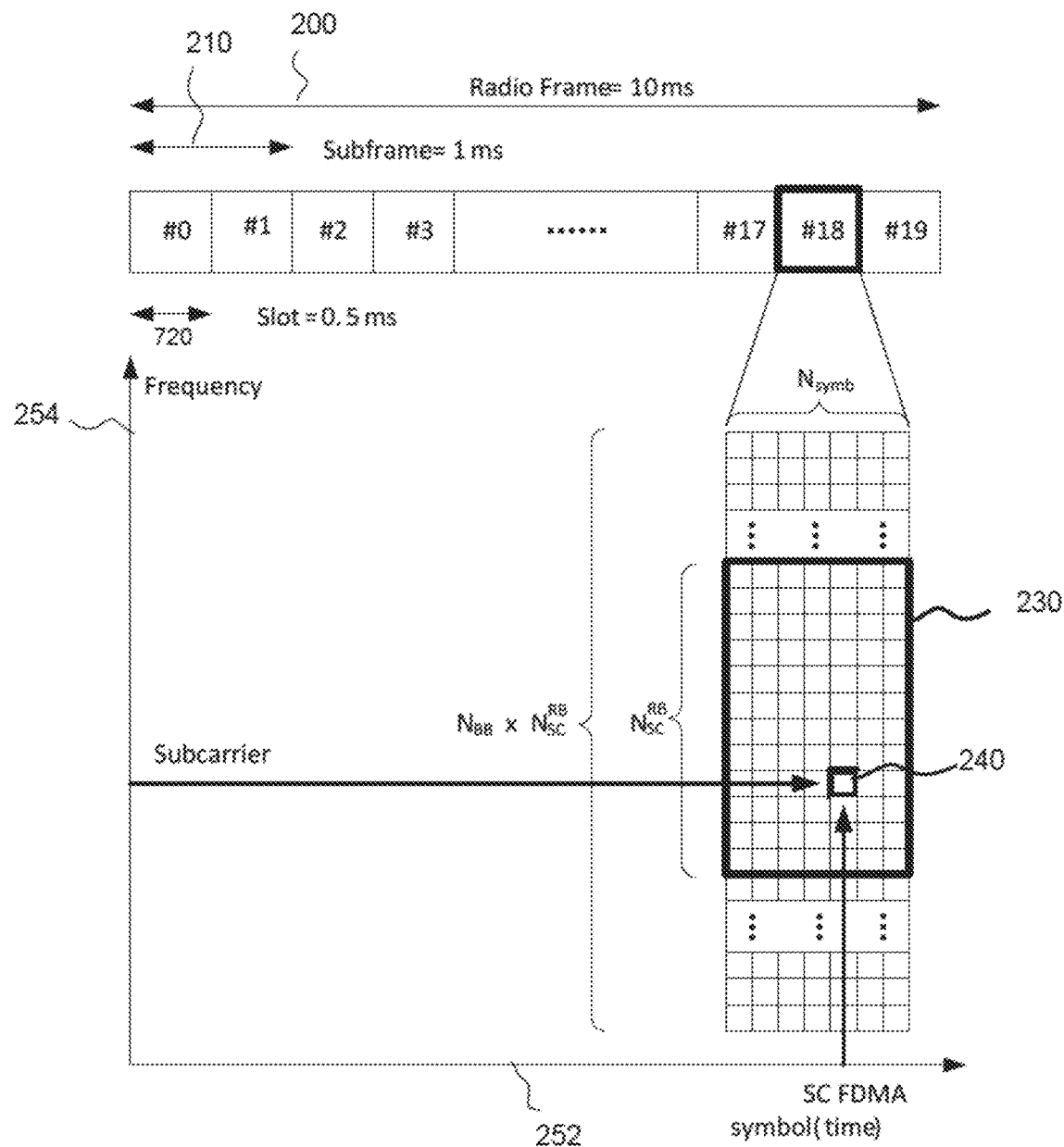
FIG. 2 schematically illustrates a block diagram of radio frame resources corresponding to an uplink LTE radio frame structure.

FIG. 2 schematically illustrates a block diagram of radio frame resources corresponding to an uplink LTE radio frame structure, which is the same as a D2D "SL" radio frame structure. A radio frame 200 has a duration of 10 milliseconds and is composed of twenty contiguous 0.5 millisecond slots. A subframe 210 is formed from two adjacent slots and thus has a one millisecond duration. FIG. 2 shows slot #18, which is the penultimate slot of the frame, in more detail. A single resource block 230 can be seen to comprise a number of SC-FDMA symbols Nsymbol=7 on a time axis 252 and a plurality of subcarriers NSCRB=12 on a frequency axis 254. A different type of frame having an extended cyclic prefix (CP) has Nsymbol=6, but has the same number of subcarriers on the frequency axis as the normal CP resource block. The physical resource block 230 comprises a total of Nsymbol×NSCRB constituent resource elements.

A single resource element 240 is characterized by a single subcarrier frequency and a single SC-FDMA symbol. In FIG. 2, although only one complete resource block 230 is shown, a plurality of resource blocks NBB are associated with each of the twenty slots of the radio frame 200. The resource block 230 in the FIG. 2 example is mapped to eighty-four resource elements 240 using short or normal cyclic prefixing and is mapped to seventy-two resource elements using extended cyclic prefixing.

Each resource element 240 can transmit a number of bits depending upon the particular type of modulation scheme employed for the channel with which the resource element is associated. For example, where the modulation scheme is quadrature phase-shift keying (QPSK), each resource element 240 can transmit two bits. For a 16 quadrature amplitude modulation (QAM) or 64 QAM more bits can be transmitted per resource element. However, for binary phase shift keying (BPSK), a single bit is transmitted in each resource element. The resource block 230 for downlink transmission from the eNodeB to the UE is identical to the one shown in FIG. 2, but orthogonal frequency-division multiple access (OFDMA) is used for DL instead of SC-FDMA.

Figure 3:
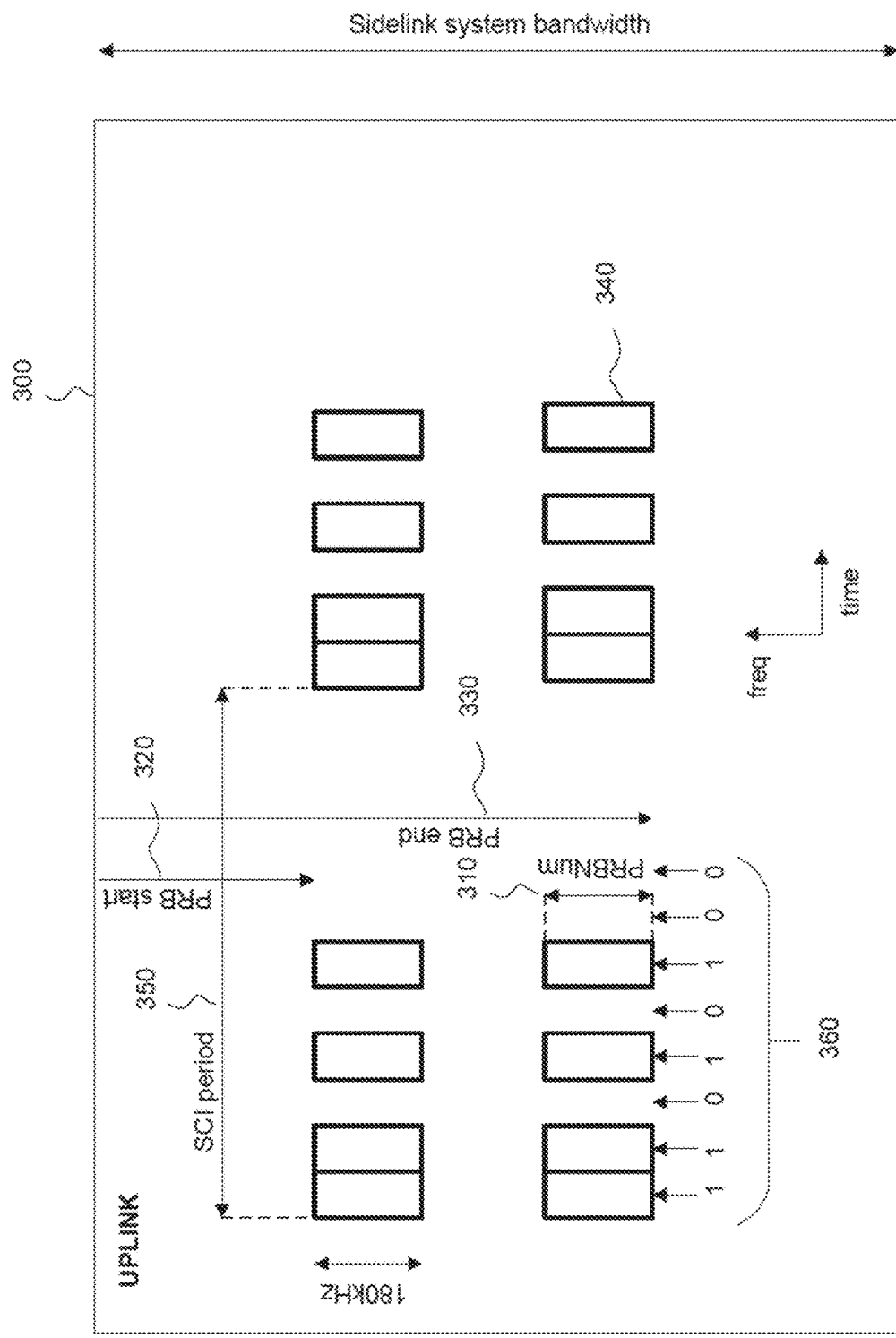
FIG. 3 schematically illustrates how a pool of uplink resources have been assigned to the PSCCH sidelink channel.

FIG. 3 schematically illustrates how a pool of uplink spectrum resources have been assigned to the PSCCH sidelink channel. FIG. 3 shows a block 300 of sidelink system bandwidth that forms part of the uplink bandwidth. Whether or not an UL subframe can be used for sidelink communication is indicated in a subframe bitmap and, after a configurable period, the Sidelink Control Information (SCI) period, the whole pattern repeats. Within such a subframe, the PSCCH resource pool is defined in frequency by three parameters: a PRBnum 310; a physical resource block (PRB) start 320; and a PRB end 330. The PRB start 320 and PRB end 330 define the start and end frequencies defining the location of two frequency bands allocated to the PSCCH. PRBnum 310 specifies an integer number of physical resource blocks (each of bandwidth 180 kHz in LTE/LTE-A) spanned by each of the two bands. A single block 340 in FIG. 3 spans a single subframe in time (i.e. 1 ms) and PRBnum resource block widths in frequency. A time domain bitmap 360, corresponding to the 8-bit value (1,1,0,1,0,1,0,0) in FIG. 3 indicates on the time axis, which subset of uplink subframes are used for PSCCH transmission. It will be appreciated that the time domain bitmap is not limited to the example bitmap of FIG. 3, but is configurable to take on any one of a number of different values and is not limited to an 8-bit value.

An SCI period 350 is shown in FIG. 3 and this can typically range from 40 ms to 320 ms, with low values being used for voice transmission. Parameters used to define the resource pool can be broadcast by an eNodeB in a System Information Block (e.g. SIB 18) but out-of-coverage UEs can use internally stored pre-configured values. The FIG. 3 construction allows for allocating several resource pools in a single subframe. The remaining resources can be used for standard uplink traffic or for other UEs. Note that a given UE can use a subframe corresponding to a given carrier for either UL or for SL but not for both.

In addition to the PSCCH pool illustrated in FIG. 3 for communicating SL control information, there is also a corresponding PSSCH pool for communicating SL data. The PSSCH resource pool is defined in a similar way to the PSCCH pool, being characterized by PRBstart, PRBend, PRBnum, a time domain bitmap and an SCI period.

A D2D UE performing a SL transmission is configured to send an SCI Format 0 on the PSCCH having content shown in the table below. This SCI Format 0 message specifies the time-frequency resources within the PSSCH pool that is used for D2D data transmission.

| SCI Format 0 | |
|---|---|
| Modulation and Coding Scheme | 5 bits |
| Time Resource Pattern (T-RPT) | 7 bits |
| Timing Advance Indication | 11 bits |
| Group Destination ID | 8 bits |
| Resource Block Assignment and Hopping Flag | 5 to 13 bits |
| Frequency Hopping Flag | 1 bit |

Considering first a receiving side of a D2D communication, in the SCI Format 0, the Group Destination ID is used by receiving devices to determine if they have any interest in the received D2D communication. If the Group Destination ID does not match then the receiving UE can monitor the SL channels until the next SCI-period. The T-RPT indicates to receiving UEs which resources of the PSSCH they should decode in the time domain. The Resource Block Assignment and hopping patterns indicate to the receiving UEs which resources of the PSSCH they should decode in the frequency domain. The Timing Advance Indication is used to compensate reception window timing difference of PSSCH relative to PSCCH.

Considering now the transmitting side of a D2D communication, the SCI Format 0 is transmitted using resources of the PSCCH pool. Two modes of sidelink transmission are available for an in-coverage scenario: "Mode 1" or "scheduled resource allocation" where the UE has to be connected to an eNodeB to transmit sidelink data; "Mode 2" or "UE autonomous resource selection" where the UE does not typically implement a connection to the eNodeB, but autonomously and randomly selects resources within the PSCCH pool in which to transmit the SCI Format 0 message.

In Mode 1, the UE can indicate to the eNodeB that it wishes to use D2D communication, whereupon the eNodeB can assign the UE a SL Radio Network Temporary Identifier (SL-RNTI) for use in scheduling any future D2D transmission. When the UE has some data to transmit in D2D mode it can send a SL Buffer Status Report (SL-BSR) to the eNodeB indicating how much data is to be transmitted in D2D mode. The eNodeB can allocate both PSCCH and PSSCH spectrum via a downlink control information (DCI) Format 5 message on the Physical Downlink Control Channel (PDCCH), similar in content to the SCI Format 0 and scrambled using the SL-RNTI. The UE can then use the received information in the DCI Format 5 message to decide which PSCCH spectrum to use to send the SCI Format 0 message and sends data over resources allocated by the eNodeB for PSSCH transmission.

In Mode 2 there can be a plurality of transmission resource pools, for example eight transmission pools, each pool having a respective list of priorities associated with it. A given priority value can be mapped to one or more different resource pools. The number of resource pools can be configurable. The transmission priority of data in the physical layer can correspond to a priority associated with a logical channel (Media Access Control (MAC) layer). Multiple logical channels can have the same priority value associated with them. In one embodiment, for Mode 2 D2D communications there are eight PSCCH resource pools for SL control linked with eight PSSCH pools for SL data. A list of transmission and/or per-packet priorities is associated with each resource pool. The different pools have different radio spectrum resources assigned to them. The priorities list can be provided in SIB 18. Alternatively, the priorities list can be provided in an SCI message such as SCI format 0.

Figure 4:
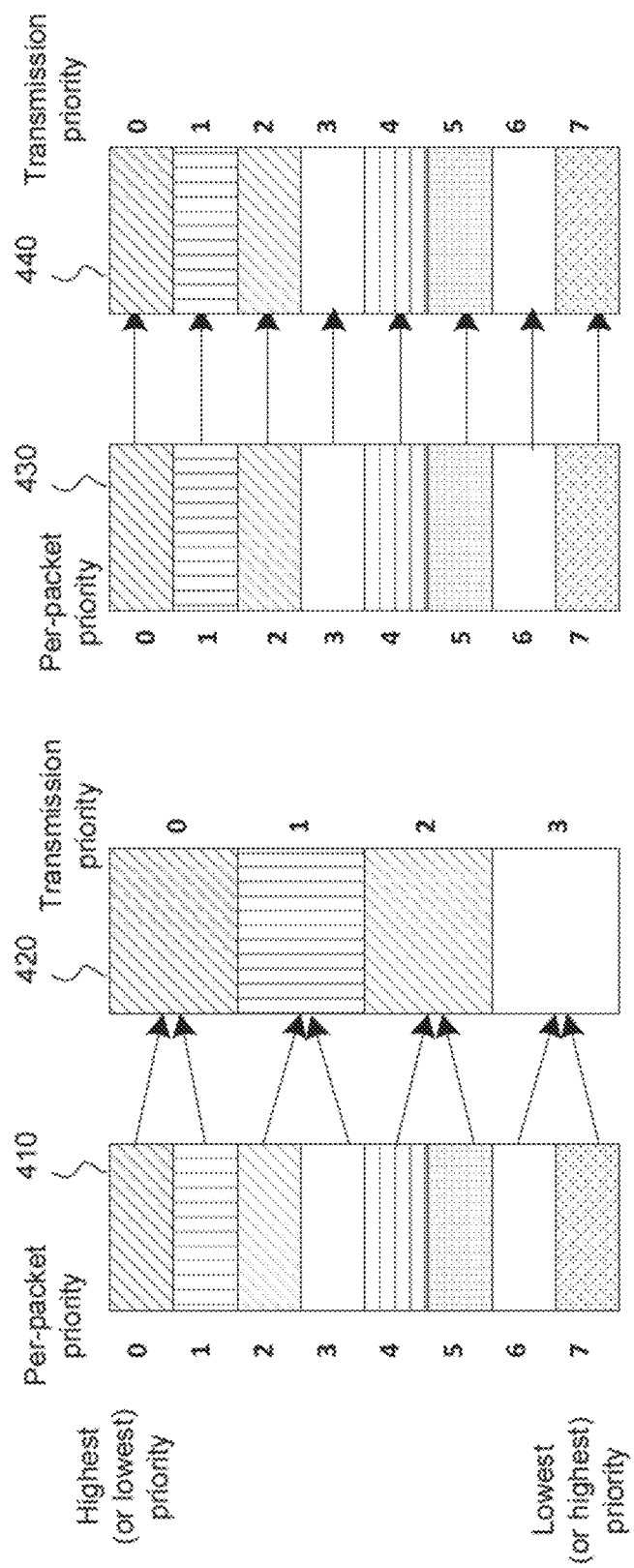
FIG. 4 schematically illustrates both a priority value remapping and a one-to-one mapping between a set of per-packet priorities of the application layer and a set of transmission priority values.

According to the present technique a per-packet priority of an application layer is mapped to a transmission priority of a physical layer as shown in FIG. 4.

Figure 5:
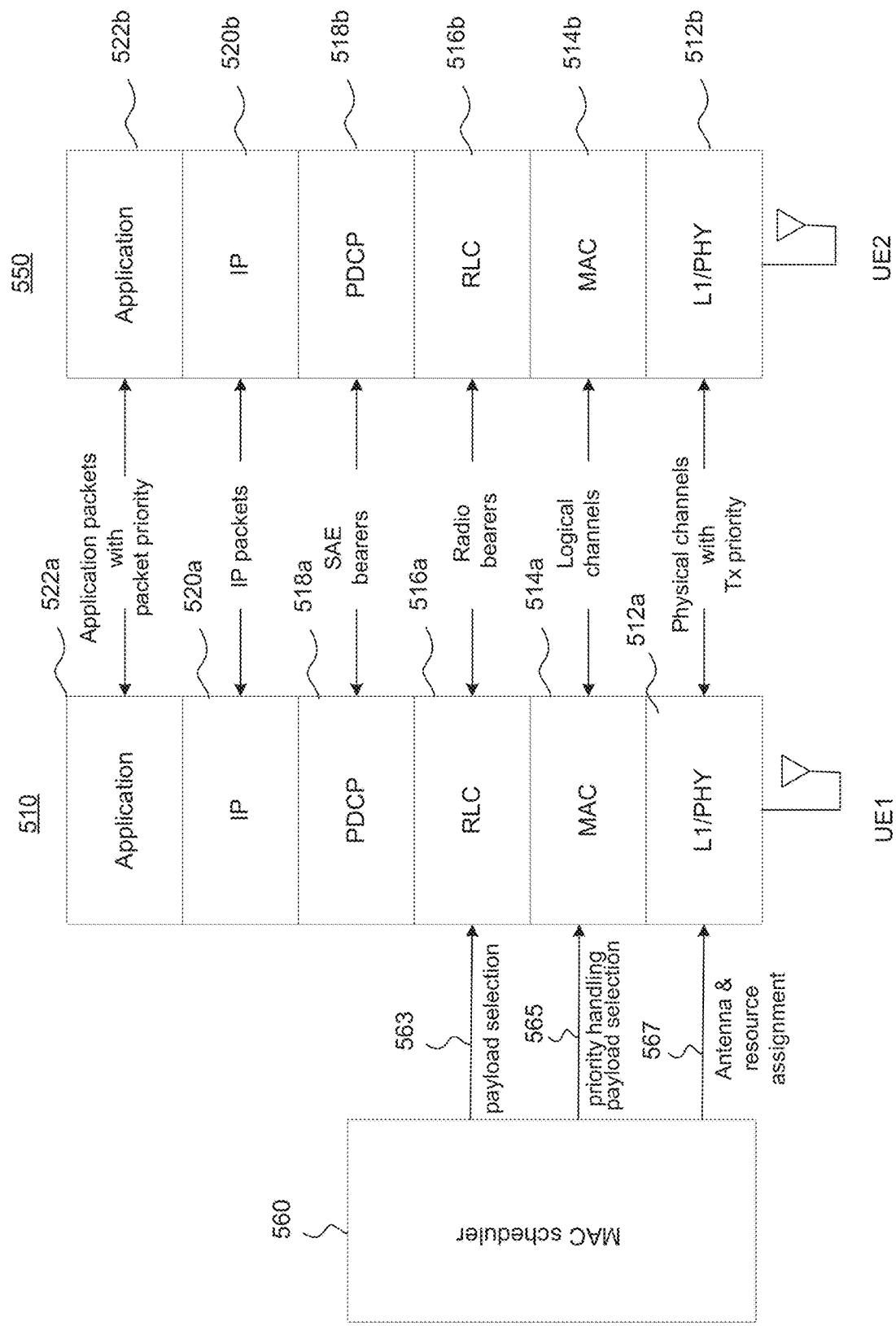
FIG. 5 schematically illustrates a wireless network protocol stack representing protocol layers relevant to a D2D communication.

FIG. 5 schematically illustrates a wireless network protocol stack representing protocol layers relevant to a D2D or ProSe communication between a first UE 510 and a second UE 550. Starting from a lowest protocol layer, the first UE has: an L1 or physical (PHY) layer 512a; a MAC layer 514a; a Radio Link Control (RLC) layer 516a; a Packet Data Convergence Protocol (PDCP) layer 518a; an Internet Protocol (IP) layer 520a; and an application layer 522a. The second UE 550 has a corresponding stack of protocol layers comprising: a PHY layer 512b; a MAC layer 514b; an RLC layer 516b; a PDCP layer 518b; an IP layer 520b; and an application layer 522b. A MAC scheduler is associated with the MAC layer 514a of the first UE and this outputs payload selection control information 563 to the RLC layer 516a, outputs priority handling and payload selection control information 565 to the MAC layer 514a and also sends antenna and resource assignment information 567 to the PHY layer 512a. The per-packet priority according to the present technique is associated with the application layer 522a, 522b and the transmission priority is associated with at least one of the PHY layer 512a, 512b and the MAC layer 514a, 514b. A corresponding MAC scheduler (not shown) is also provided in the second UE 550. Communication of data is encapsulated in different ways depending upon the protocol layer. In particular, in the PHY layer 512a, 512b, data is communicated on physical channels across a wireless interface depending upon a transmission priority according to the present technique. In the MAC layer 514a, 514b, data is communicated in logical channels having associated transmission priorities. In the RLC layer 516a, 516b data is communicated on radio bearers whilst in the PDCP layer 518a, 518b it is communicated in System Architecture Evolution (SAE) bearers. In the IP layer 520a, 520b, IP packets are used. In the uppermost layer, the application layer 522a, 522b, application data packets are assigned a per-packet priority. It is this application layer per-packet priority that is mapped through the protocol layers right down to the transmission priority of the MAC layer 514a, 514b and the PHY layer 512a, 512b according to the present technique. This provides an "end-to-end" priority. The per-packet priority is provided in the application layer by an application or a service running on a UE, which is a higher layer of the wireless network protocol stack. Accordingly, even in Mode 1, the eNodeB should not be able to override this per-packet priority value.

Figure 6:
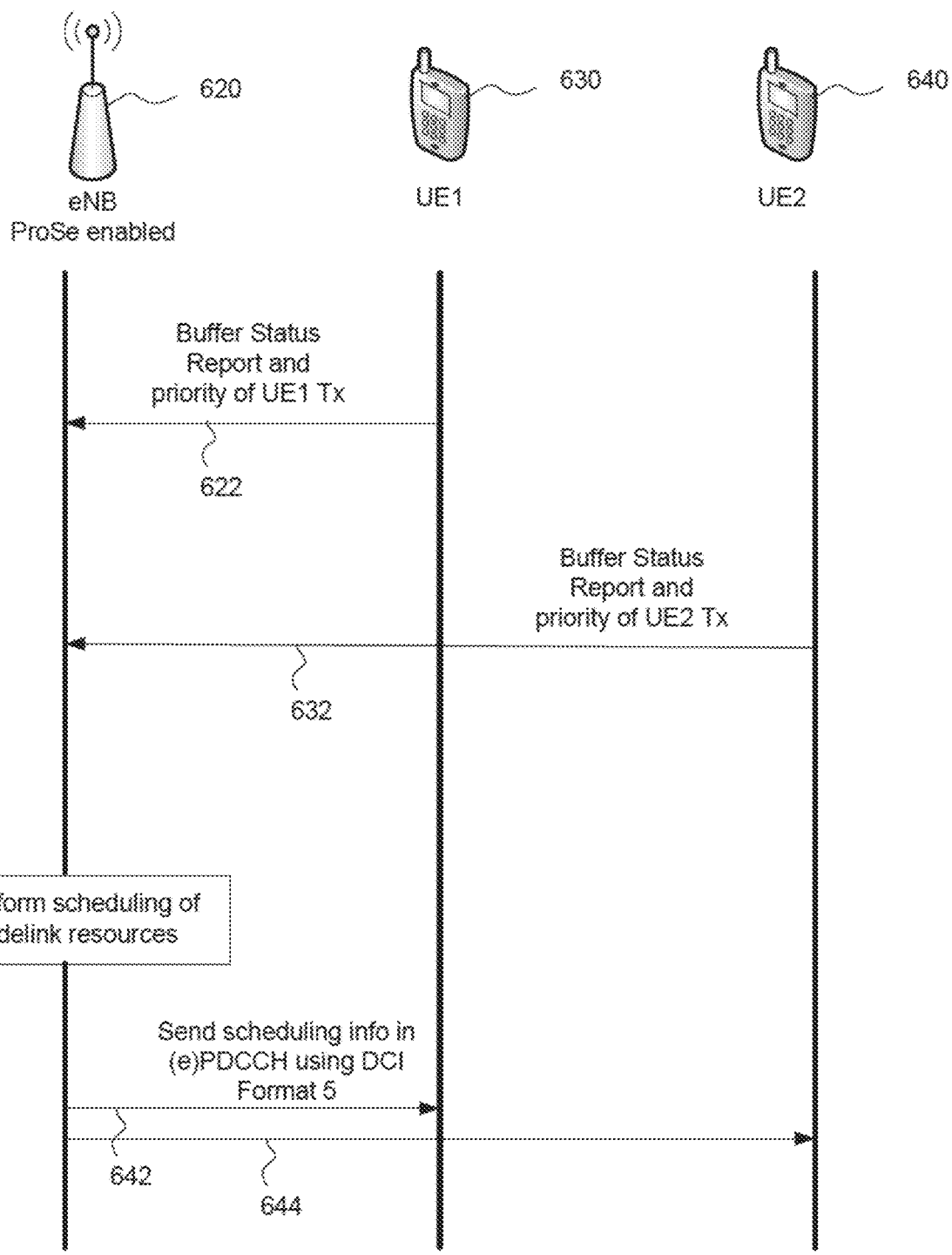
FIG. 6 is a signal flow diagram schematically illustrating how radio resource allocation is performed for mode 1 SL communication.

FIG. 6 is a signal flow diagram schematically illustrating how radio resource allocation is performed based on the priority value(s) according to the present technique in the case of mode 1 SL communication. As shown in FIG. 6, a ProSe enabled eNodeB 620 allocates resources on an enhanced PDCCH (ePDCCH) channel based upon priority data received from a first UE 630 and a second UE 640. UEs 630, 640 send Buffer Status reports (BSRs) for Logical Channel Groups (LCGs) depending upon a set of trigger conditions such as: when new data arrives in previously empty buffers at the beginning of an UL data transmission; when a UE is waiting for access to transmission resources but new higher priority data becomes available for transmission in the interim; when the eNodeB is being updated about buffer status, e.g. when the UE is uploading a file; and depending upon a BSR retransmission mechanism. BSRs provide a way of enabling an eNodeB to schedule UL resources to UEs depending upon target quality of service criteria. A given UE can be simultaneously connected to an Instant Messaging Service and the Internet, for example, so can have multiple associated radio bearers configured in addition to the resources used for RRC signaling. To simplify signaling a given radio bearer (or logical channel) is mapped to a Logical Channel Group (LCG), the particular LCG depending upon, for example, a Quality-of-service Class Identifier (QCI). According to the present technique, the per-packet priority information and/or its mapping to the transmission priority is integrated into BSRs. This allows reporting to the eNodeB by each UE, a status of buffers in the UE corresponding to each of a plurality of priority levels. Thus the first UE 630 sends a BSR communication 622 including priority information relative to buffered data for transmission to the ProSe eNodeB 620. Similarly, the second UE 640 sends a BSR communication 632 including priority information relative to buffered data for transmission to the ProSe eNodeB 620. The eNodeB 620 collates the information from the first and second UEs 630, 640 requesting allocation of UL transmission resources and performs scheduling of SL resources accordingly—for example, by mapping the per-packet priority to an LCG. The ProSe eNodeB sends a scheduling information signal 642 to the first UE 630 and a scheduling information signal 644 to the second UE 640 on the PDCCH (or ePDCCH) using a Downlink Control Information (DCI) Format 5 message. The DCI Format 5 message comprises the following information:

| DCI Format 5 | |
| --- | --- |
| Resource for PSCCH | 6 bits |
| Transmit Power Control (TPC) command for PSCCH and PSSCH | 1 bit UE can Tx on max power if this bit not set |
| Resource Block Assignment and Hopping Resource allocation | 5-13 bits |
| Frequency Hopping Flag | 1 bit |
| Time Resource Pattern (T-RPT) | 7 bits |

In mode 1 there is no pre-allocated resource for PSSCH, i.e. SL data. Instead the PSSCH resource is assigned on demand by the eNodeB via parameters shown in the last three rows of DCI Format 5 above. The resource bock assignment bits, frequency hopping flag and T-RPT define the allocation for the PSSCH and are transmitted in SCI format 0 or via a new "SCI-X". The eNodeB also gives access to PSCCH resources.

Figure 7:
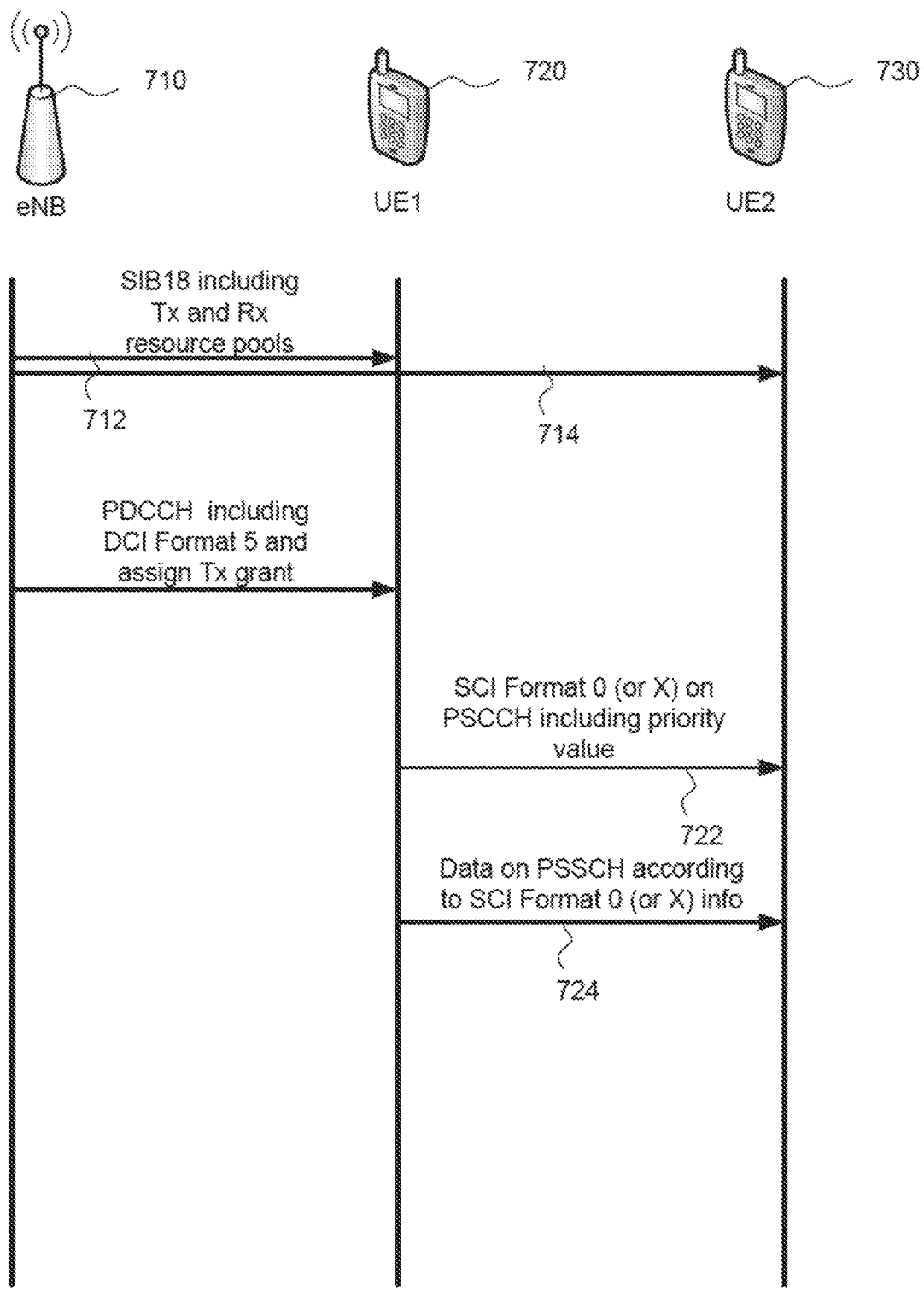
FIG. 7 is a signal flow diagram schematically illustrating how radio resource allocation is performed for mode 2 SL communication.

FIG. 7 is a signal flow diagram schematically illustrating how radio resource allocation is performed based on the priority value(s) according to the present technique in the case of mode 2 SL communication when the UEs are in-coverage of a ProSe eNodeB. In FIG. 7 a ProSe eNodeB 710 is in communication with a first UE 720 and a second UE 730. The eNodeB sends information on the SL transmit and receive resource pools via a SIB 18 message 712, 714 and sends on PDCCH/ePDCCH a communication granting the first UE 720 permission to transmit via a D2D communication, data directly to the second UE 730. The PDCCH/ePDCCH communication includes a DCI Format 5 message. The eNodeB 710 indicates support of SL communication with the presence of the SIB 18, which has a number of optional data fields. For example, the SIB 18 can comprise a "commRxPool" 16-bit field having a list of up to 16 resource pools in which a UE is allowed to receive a SL transmission; a 4-bit field "commTxPoolNormalCommon" indicating up to 4 resource pools to be used when the UE is in an radio resource control (RRC) idle state; a 4-bit field, commTxPoolExceptional" to be used when the UE is in transition between an idle RRC state and a connected RRC state, due to, for example, a detected radio link failure which subsequently causes an RRC connection re-establishment; and a commSyncConfigList field having information for synchronization between the two UEs 720, 730 when they are not in coverage in the same cell.

In FIG. 7, after receipt of the SIB18, the first UE 720 then sends an SCI Format 0 (or SCI Format X) including a per-packet priority and/or transmission priority value to the second UE via a signal 722. Transmission data is sent from the first UE 720 directly to the second UE 730 on PSSCH according to the SCI format 0 (or SCI Format X) information via a D2D communication 724. The SCI format 0 (or SCI Format X) specifies the portion of the resource pool that is used for D2D transmission. In mode 2 the transmitting UE autonomously and randomly selects a subset of resources from the PSCCH resource pool in which to transmit the SCI format 0 (or SCI Format X). The SCI format 0 (or SCI Format X) can contain all parameters utilised for mode 2 when the UEs 710, 730 are in coverage, but for out-of-coverage scenarios, the relevant parameters can be pre-configured in memory of the UE itself or on a Subscriber Identity Module (SIM) card.

The Operation Principles for Priority Support according to the present technique are such that in various LTE designs, it is desirable to enable priority support for Device-to-Device Communication. In various designs, the following operation principles may be enabled:

A single user equipment (UE) may transmit packets of different priorities on PC5. Support of eight priority levels for mapping of application level priorities may be sufficient.

Upper layers may provide to the access stratum a ProSe Per-Packet Priority from a range of possible values.

The ProSe Per-Packet Priority may be used to prioritize intra-UE and inter-UE transmissions.

The use of the ProSe Per-Packet Priority may be neutral to whether the UE is accessing the medium in scheduled (mode 1) or non-scheduled (mode 2) transmission mode.

The way the medium is accessed may vary.

The ProSe Per-Packet Priority may be the only information provided to lower layers such as the MAC and PHY layers illustrated in FIG. 5. Radio Bearer information may be provided from higher layers.

The ProSe Per-Packet Priority may be independent of L2 (MAC) destination.

The ProSe Per-Packet Priority mechanism may be applied between a Remote UE and a Relay UE, or between two UEs as a part of one-to-one communication, or between one UE and a group of recipient UEs as shown for example in the D2D arrangement of FIG. 1.

Design options to support priority handling for sidelink communication are described herein.

In various embodiments, support of the ProSe per packet priority may be enabled in order to enable preferential access to traffic with higher priority. In embodiments, principles of association of sidelink resources, transmission probabilities and/or designing autonomous monitoring procedure may be utilized to support preferential access, reduced collisions and fair resource usage with the adaptive change of the amount of utilized resources and timescales for preemption.

In some scenarios, there may be no support of ProSe per packet priority in LTE standards and embodiments may target SL communication.

Considering now a mapping of physical layer per-packet priority to transmission priority, in embodiments, ProSe "packet" may be a higher layer definition (e.g. application layer) which may not be related with a physical transport block size. The ProSe packet may include different sizes and potentially may also designate "communication session" composed from multiple packets of the same priority level. In various embodiments, the application itself may generate packets of different priorities.

For priority handling at L1/L2 (PHY/MAC), it may be more convenient to utilize with the term "transmission priority" instead of per-packet priority. In a basic scenario, the per-packet priority may be directly mapped to the transmission priority, for example without re-mapping at low protocol layers. Alternatively, there may be an additional upper layer procedure/function defined (e.g. L2 procedure) to map aggregated traffic and per packet priority to the "transmission priority" level. FIG. 4 schematically illustrates a priority value remapping between a set 410 of per-packet priorities of the application layer to a smaller set of transmission priority values. In particular the eight per-packet priority values ranked from highest to lowest priority (top to bottom) or vice versa are mapped in contiguous pairs to respective ones of a set 420 of four transmission priority values. For example, per-packet priorities 0 and 1 are both mapped to transmission priority 0 in set 420; per-packet priorities 2 and 3 are both mapped to transmission priority 1 in set 420 and so on. Per-packet priority set 430 is identical to the priority stack 410, but instead of remapping between the two different categories of priority stack, it features a simple one-to-one mapping between the per-packet priority stack 430 and the corresponding transmission priority stack 440, which also has eight priority values.

In various embodiments, the following major design aspects may be utilized for integration of priority handling mechanism into LTE Sidelink D2D communication technology:

Priority Handling Methods (Preemption Methods). In various embodiments, UE behavior and preemption rules/conditions may be determined in terms of access to resources and release of resources to enable preferential access to the resources for UEs having higher priority traffic.

Figure 8:
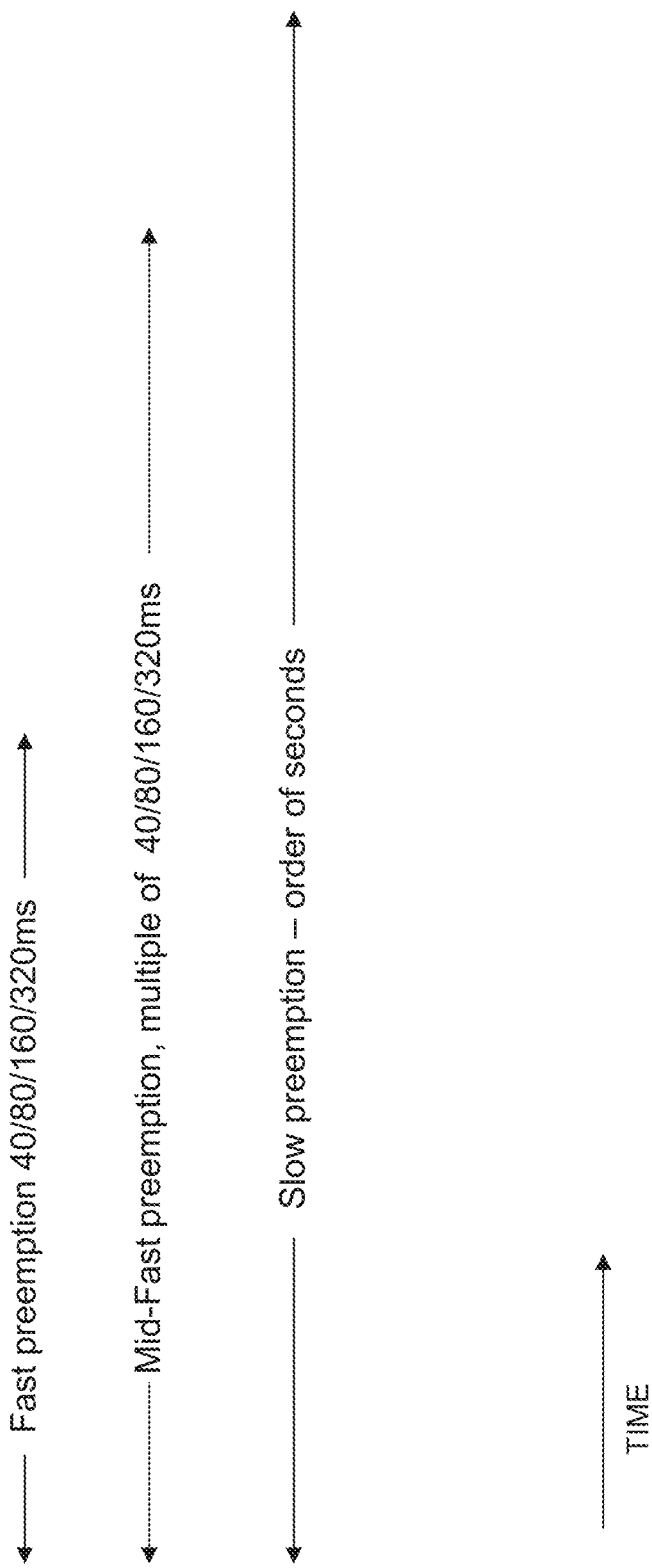
FIG. 8 schematically illustrates relative timescales for fast preemption, mid-fast preemption and slow pre-emption.

Priority Handling Timescale (Preemption Timescale). In various embodiments, the priority handling timescale may determine how fast the preemption may happen. Depending on the value of this parameter, different design options may be utilized. FIG. 8 schematically illustrates relative timescales for fast preemption, mid-fast preemption and slow preemption.

Fast Preemption (Short Priority Handling Timescale)—In various embodiments, a priority handling mechanism may operate over a timescale within one sidelink communication period also called sidelink control information period (e.g., SCI period with 40/80/160/320 ms depending on configuration settings) or below. To enable fast preemption, a L1 preemption procedure may be utilized.

Mid-fast Preemption (Medium Priority Handling Timescale)—In various embodiments, a priority handling mechanism may operate over a timescale within multiple SCI periods (e.g. within multiple of 40/80/160/320 ms depending on the SCI period value). The mid-fast preemption may be a L1/L2 preemption protocol.

Slow Preemption (Long Priority Handling Timescale)—In various embodiments, a priority handling mechanism may operate over a timescale on the order of second(s). Mechanisms defined at higher layers (e.g. application layer mechanisms such as flow control) may be utilized to handle slow preemption.

Intra and inter-UE priority handling. In various embodiments, support of inter-UE prioritization may include additional consideration of multiple aspects, such as:
Medium access and resource sharing mechanism;
Collision/congestion avoidance in case of different or same priority level;
Fair share of sidelink spectrum resources among UEs/packets having the same priority level.
Compatibility considerations—In various embodiments, communication with LTE Release 12 D2D capable UEs which may not be aware about priority levels can be supported.

Note that the terms priority handling or preemption may be used interchangeably herein.

In various embodiments, design options may facilitate one or more of:
Preemption methods/procedures;
Different mechanisms to enable configurable or adaptive timescales for priority handling;
Different medium access and resource sharing mechanisms;
Collision avoidance in case of different or same priority levels;
Fair sharing of sidelink spectrum resources among UEs/packets having the same priority level in LTE Sidelink (D2D communication technology).

In order to enable priority handling for LTE R.13 SL (D2D) communication, multiple methods are described herein. However before discussion of priority handling methods, priority handling for different sidelink transmission modes is discussed, including:

1) Mode 1—evolved NodeB controlled, when an eNodeB assigns resources for D2D transmission in control (PSCCH) and data (PSSCH) resource pools; and 2) Mode 2 UE-Autonomous, where the UE may select transmission resource from the predefined resource pools for both SL control (PSCCH) and SL data (PSSCH).

For sidelink transmission mode 1, the priority handling may be supported by eNodeB implementation. In various embodiments, in order to support priority handling mechanisms running across multiple UEs, eNodeB may be aware about status of UE buffers for each priority level. In various embodiments, the following changes relative to the LTE Release 12 specification may be utilized:
Reporting of priority information to eNodeB.
Priority information integration to the Buffer Status Report (BSR).
Report of amount of direct traffic per priority level, so that eNodeB may be aware about the buffer for each priority level or map priority to a logical channel group.

In various embodiments, the amount of traffic per priority and priority information may be utilized by an eNodeB for scheduling D2D transmissions (TXs) and for control of preemption.

In various embodiments, priority handling for SL transmission Mode 2 may include the distributed procedure being defined for preemption support. This procedure may target only priority issues, or may additionally aim to reduce collisions and ensure resource fairness among UEs having the same or different priority levels. In various embodiments, priority handling for Mode 2 operation may be performed.

In various embodiments, in a resource partitioning method, available SL resources may be associated with different priority levels, so that UEs may transmit in the resources associated with the corresponding priority levels. Based on the LTE Release 12 design, several resource partitioning mechanisms may be enabled to support priority handling.

In general, the sidelink transmission priority may be associated with: the sidelink control resources only (PSCCH); sidelink data resources only (PSSCH); or both control and data resources (PSCCH & PSSCH).

Examples rules for assigning priorities to Physical Sidelink Shared Channel (PSSCH-Data) are as follows:
(i) Association of different PSSCH pools with different priority levels (see FIG. 9);
(ii) Association of different SL transmission periods of PSSCH and/or PSCCH pools with different priority levels.
(iii) Association of different SL transmission periods of PSSCH and/or PSCCH pools with different priority levels (see FIG. 10).
(iv) Association of different T-RPT patterns (or subset of T-RPT patterns within single or multiple PSSCH pools) with different priority levels (see FIG. 11).
(v) Association of pool frequency resources with different priority levels.
(vi) A combination of one or more selected from any of the above rules (i) to (v) in any combination to map priority level to sidelink spectrum resources.

Figure 9:
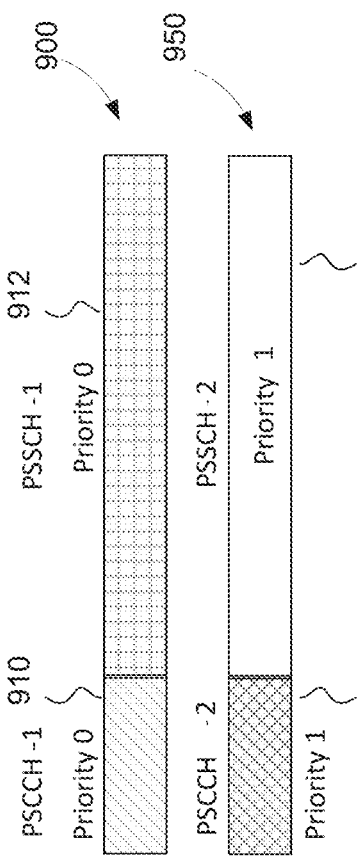
FIG. 9 schematically illustrates an example priority to PSCCH/PSSCH pool association.

FIG. 9 schematically illustrates an example priority to PSCCH/PSSCH pool association in which a first SL pool 900 comprising PSCCH-1 control 910 allocation at priority 0 and data PSSCH-1 912 allocation also at priority 0. By way of contrast, a second SL pool 950 has PSCCH-2 control allocation 952 at priority 1 and PSSCH-2 data allocation 954 at priority 1.

Figure 10:
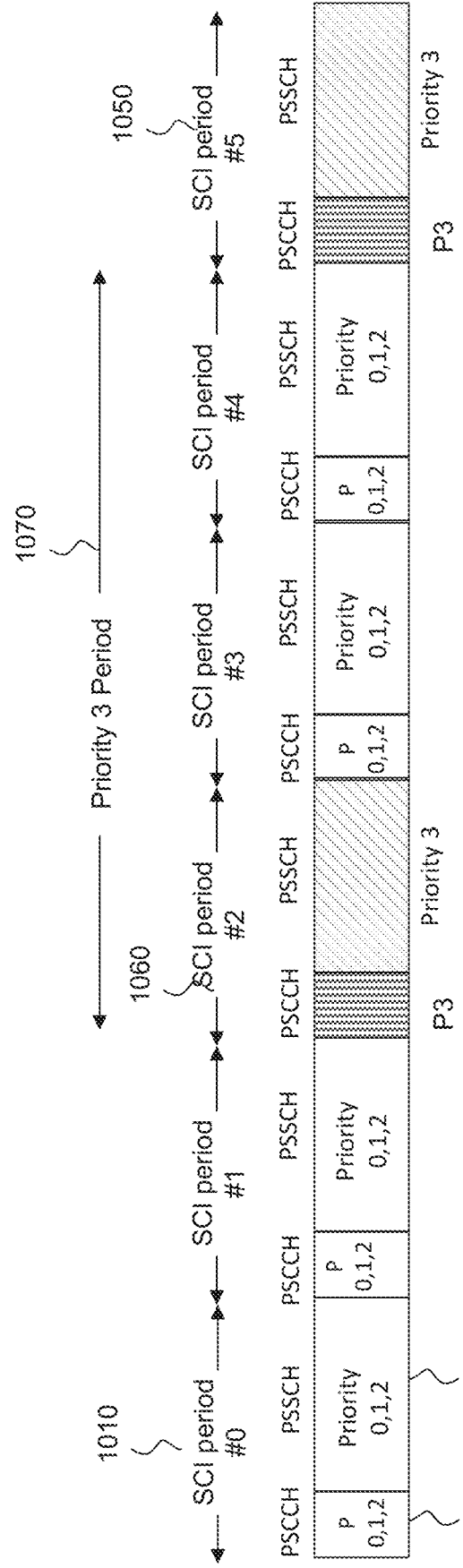
FIG. 10 schematically illustrates an association of different SL transmission periods of PSSCH and/or PSCCH pools with different priority levels.

FIG. 10 schematically illustrates an association of different SL transmission periods of PSSCH and/or PSCCH pools with different priority levels. FIG. 10 shows a total of six SL Control Information periods (SCI) from SCI period #0 1010 through to SCI period #5 1050 The SCI period #0 has a control portion PSCCH 1012 having associated priority values 0, 1 and 2 and a corresponding data portion PSSCH 1014 having the same set of possible priority values. A PSCCH/PSSCH pair at SCI period #2 each have a single associated priority value of 3 and an identical pair having identical priorities occurs at SCI period #5, so that the period 1070 of repetition of the priority 3 is three SCI periods as shown.

Figure 11:
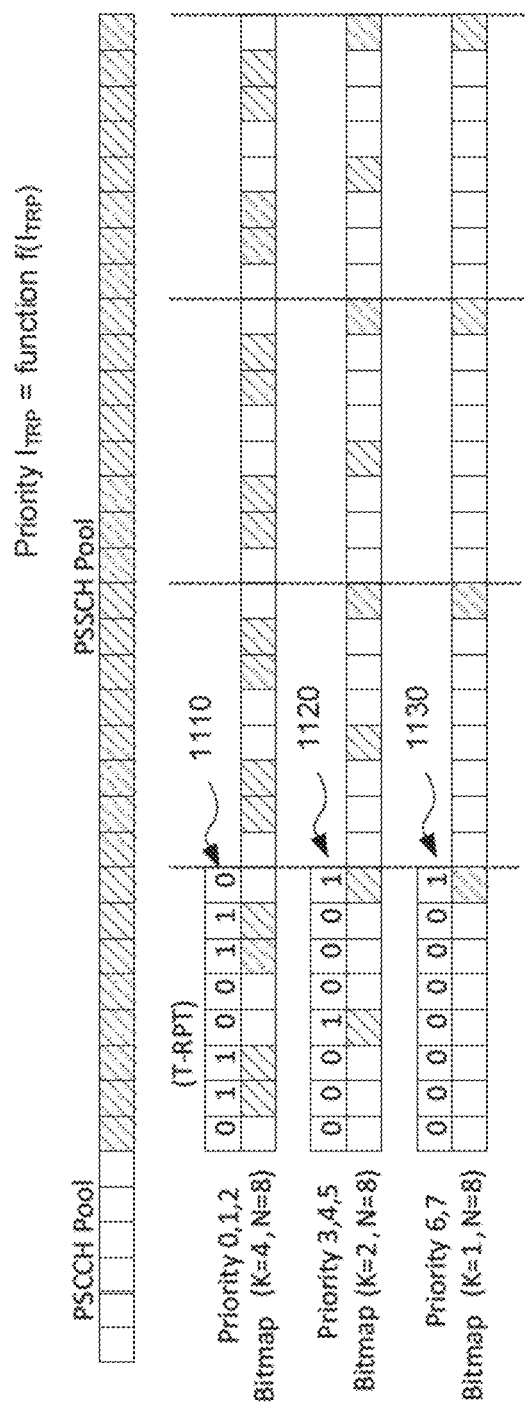
FIG. 11 schematically illustrates an example of priority mapping to time resource pattern (T-RPT) patterns.

T-RPT patterns (or a subset of T-RPT patterns within single or multiple PSSCH pools) can be associated with different priority levels. The priority level of T-RPT pattern $p_{TRP}=f(I_{TRP})$ may be a function of T-RPT index—ITRP, where pTRP is the priority level. FIG. 11 schematically illustrates an example of priority mapping T-RPT patterns. FIG. 11 shows three different T-RPTs having three respective sets of priority values within a PSSCH resource pool. A first eight bit T-RPT 1110 having four non-zero bits (K=4) has a priority values set (0,1,2); a second T-RPT pattern 1120 having two non-zero bits (K=2) has a priority values set (3,4,5); and a third T-RPT 1130 having one non-zero bit has a priority values set (6,7).

For PSCCH the following example set of rules for priority levels can be used:
a) Association of different PSCCH pools with different priority levels b) Association of different transmission periods of PSCCH and/or PSSCH pools with different priority levels
c) Association of different SCI resources ($n_{PSCCH}$) within PSCCH pool (or subsets of SCI resources within PSCCH pool) with different priority levels. For example, the PSCCH resource priority level $p_R$ may be a function of SCI resource index $n_{PSCCH}$, i.e. $p_R=f(n_{PSCCH})$, e.g. $p_R=\text{mod}(n_{PSCCH}, p_{max})$ or $p_R=\lfloor n_{PSCCH}/p_{max}\rfloor$, where $p_{max}$—is a maximum defined priority. (see FIG. 12)
d) Combination of PSSCH and PSCCH resources with priority levels.
e) Any combination of two or more described above methods a) to d) may be used to define resource to priority mapping and enable priority handling on sidelink.

Figure 12:
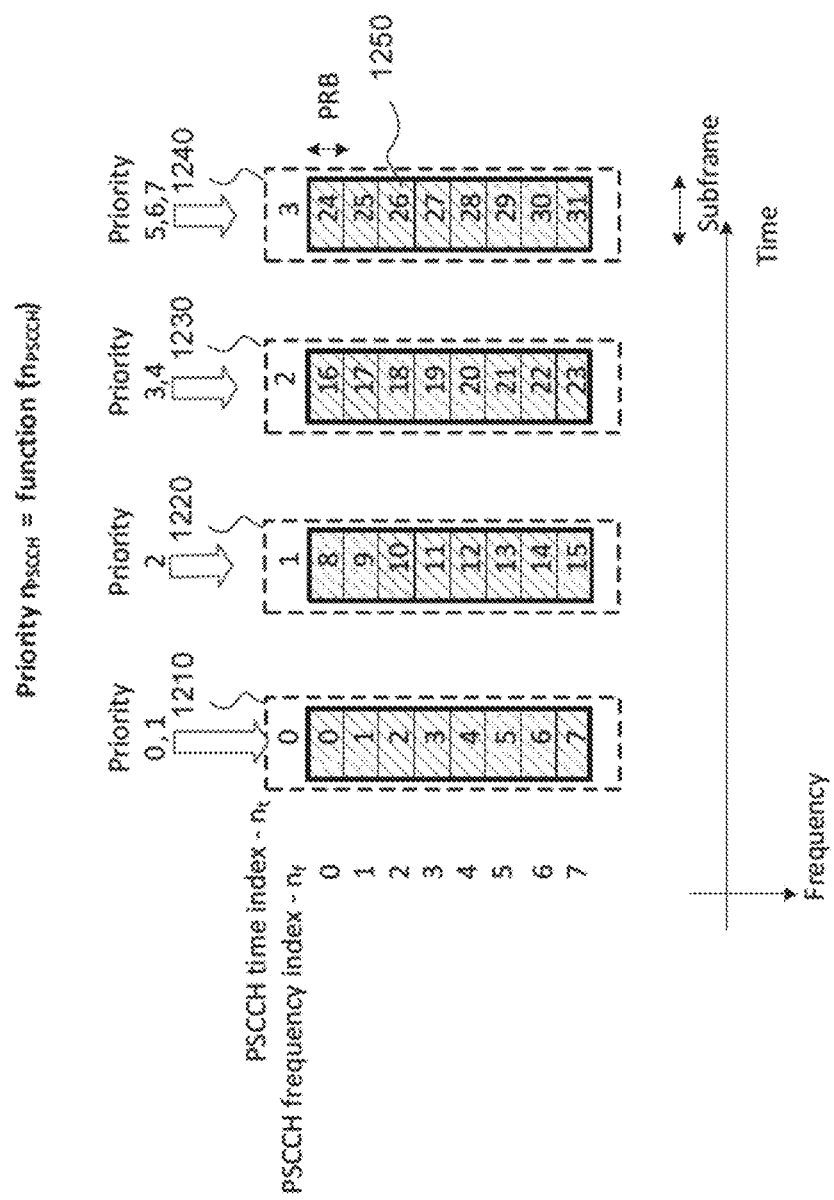
FIG. 12 schematically illustrates an example of priority mapping to a PSCCH resource index.

FIG. 12 schematically illustrates an example of priority mapping to a PSCCH resource index where four groups of resources 1210, 1220, 1230, 1240 each spanning eight physical resource blocks in the frequency dimension and one subframe (two slots) in the time dimension are allocated different priority values. The first resource group has a PSCCH time index nt=0 and priority values 0,1; the second resource group has a PSCCH time index nt=1 and priority value 2; the third first resource group has a PSCCH time index nt=2 and priority values 3,4; and the fourth resource group has a PSCCH time index nt=3 and priority values 5, 6, 7. The entity 1250 in the fourth resource group 1240 corresponds to a physical resource block pair of a subframe.

Resource Configuration/Allocation Options—Exclusive/Shared/Overlapped

There may be several types of resource allocation: shared, exclusive and overlapped.

Figure 13A:
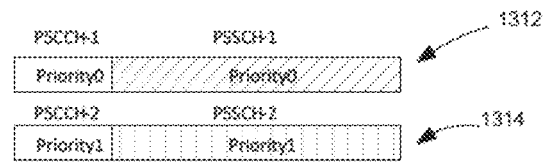
FIG. 13A schematically illustrates exclusive resource allocation where specific priorities are mapped to specific resource pools.

Exclusive resource allocation may assume that allocated physical resources do not overlap and are associated with different priority levels, so that there is no resource collision/conflict among UEs having traffic/packets with different priority levels. FIG. 13A schematically illustrates exclusive resource allocation where specific priorities are mapped to specific resource pools. In particular both PSCCH and PSSCH for a first resource pool 1312 are mapped to priority 0 and both PSCCH and PSSCH for a second resource pool 1314 are mapped to priority 1.

Figure 13B:
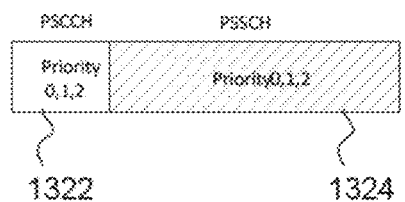
FIG. 13B schematically illustrates resource pool priority sharing where multiple priority values are mapped to the same pool.

Shared resource allocation may assume that several (two or more) priority levels are mapped to the same set of resources (e.g. resources pools, or subsets of T-RPTs, frequency resources or PSCCH resources). In this case, the resource collisions/conflicts may be possible among UEs having traffic/packets with the different priority levels mapped to the same set of sidelink resources. FIG. 13B schematically illustrates resource pool priority sharing where multiple priority values are mapped to the same pool. In particular, a PSCCH 1322 and a PSSCH 1324 of a single resource pool, which are each mapped to a plurality of priority values 0,1,2.

Figure 13C:
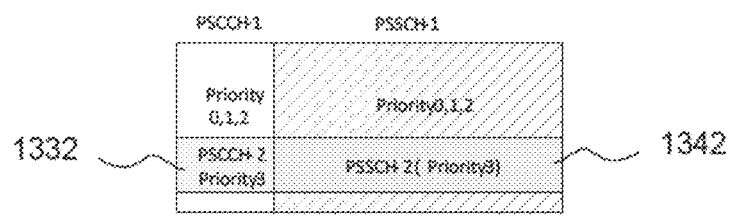
FIG. 13C schematically illustrates an overlapped resource allocation.

Overlapped resource allocation may assume that set of sidelink resources associated with certain transmission priority (e.g. low priority) may be a subset of resources associated with another priority (e.g. higher priority). FIG. 13C schematically illustrates an overlapped resource allocation in which a set of lower priority resources corresponding to PSCCH-2 1332 and PSSCH-2 1342 are a subset of resources for a resource pool comprising PSCCH-1 and PSSCH-1.

In general, all of the above resource configuration options may be enabled to support priority handling for LTE Rel.13 Sidelink (D2D or ProSe) Communication. Although, different resource allocation options may have different performance, this aspect may be left up to eNodeB implementation.

Resource Constraints (Quota/Share)

According to LTE Release 12 (and later) Mode 2 operation, UE (D2D TX) may randomly select the resource within configured resource pools (PSCCH/PSSCH). In PSCCH, UE may be constrained to use a single PSCCH resource per pool, however for PSSCH UE may occupy the whole PSSCH bandwidth for transmission. In various embodiments, in order to avoid such behavior additional minimum (min) and/or maximum (max) resource quota and/or resource grant settings may be configured by eNodeB for each priority level, in order to control max/min amount of resources occupied by UE. The introduction of resource quotas and grants may help to address collision and fairness. In addition, it may be used for fair preemption based on different sensing based methods.

Resource Quota

In various embodiments, the resource quota may be defined as a max or min amount of time-frequency sidelink resources (e.g. amount of PRBs, or subframes or total amount of PRBs across multiple subframes), that UE (D2D transmitter) may use over predefined time interval, e.g. preemption period or cycle configured by eNodeB. The max quota, if configured, may support that UE may not occupy more resources than allowed by eNodeB. The min quota, if configured, may be used to define the minimum number of resources that UE may use in case of competition for resources if the resource release condition is not met.

Resource Grant Size

In various embodiments, the resource grant size may be defined as a max or min amount of time-frequency resources (e.g. amount of PRBs, or subframes or total amount of PRBs) that UE may utilize for transmission within a single SCI period of the particular PSSCH and/or PSCCH resource pool(s). The grant size may be also used to control UE behavior in case of competition for resource. For instance, if there is no competition detected the UE may utilize the resource grant of max size. Oppositely, in case of competition for resources, UE may be expected to reduce the grant size accordingly unless it reaches the min resource grant size. In this case, the UE can release resources if a preemption condition for resource release is satisfied.

Probabilistic Methods

In various embodiments, probabilistic methods may be used to address priority handling, resource collision and fairness problem for the same or different priority levels. Methods may be applied for intra and inter-UE prioritization.

In various embodiments, in a probabilistic method, D2D capable UEs may be expected to transmit inside of sidelink resource pools (PSCCH/PSSCH) according to the predefined/preconfigured transmission probabilities $P_{TX}$. The transmission probability $P_{TX}$ values may be associated with priority levels to enable preferential access to shared resources for different priorities. For instance, UEs with higher priority traffic/packets may have higher probability to transmit on sidelink resources (PSCCH/PSSCH). In various embodiments, low priority UEs may not be able to access resources even if there is no high priority transmissions and if the transmission probability is fixed. In addition, even higher priority packets are transmitted with certain probability levels, although there may be free resources. In various embodiments, this method may enable a simple priority handling mechanism which is consistent with LTE Release 12 behavior and may be easier to define in LTE Release 13 timeframe. It may be noted that the probability of transmission, $P_{TX}$, could be varied depending on the amount of resources or data rate used by D2D TX(s) over certain period of time or amount of traffic in the TX (where TX represents a transmitter) buffer for each priority level. Alternatively, the adaptive probability mechanism may be enabled that will vary transmission probability over time based on the amount of active D2D transmissions, sidelink resource utilization and/or priority level. A probabilistic mechanism(s) itself or in combination with resource partitioning methods may be used to reduce collisions and enable fair resource sharing among UEs with the same priority levels, e.g. in case of high congestion. In case of shared resource allocation and fixed transmission probability, the probabilistic method may not be able to prevent collisions between transmissions with different priority levels. For instance, the collision handling may be a critical issue, especially in case of shared resources and high competition for low priority transmission (e.g. a lot of pending/ongoing low priority transmissions).

TABLE 1

Example of mapping priority level to transmission probability

| | Priority | | | | | | | |
|---|---|---|---|---|---|---|---|---|
| | 0 | 1 | 2 | 3 | 4 | 5 | 6 | 7 |
| TX Probability | 1 | 0.8 | 0.7 | 0.7 | 0.5 | 0.25 | 0.2 | 0.1 |

Monitoring/Sensing Based Method

In various embodiments, in this method, each UE may monitor the amount of active D2D transmitters, priority levels and the amount of traffic. This monitoring may be performed by receiving the sidelink control information (SCI) sent on PSCCH. According to the monitoring/sensing based preemption procedure, D2D transmitter may signal to other proximate UEs, its own transmission priority level. The UEs with the lower priority traffic/packet may be expected to suspend their transmissions in order to enable preemption for higher priority traffic. In more advanced schemes, the amount of resources utilized by each D2D transmitter or its data rate may be also used in priority handling procedures to control collisions or fairness of resource usage. A UE, when in a preemption state can monitor D2D transmissions of active UEs but may also optionally monitor transmissions of UEs in a preemption state. This is possible if, for example, UEs in the preemption state are allowed to transmit beacons to resolve and/or evaluate preemption criteria. A UE can send a special format SCI dedicated to the preemption procedure.

Preemption Procedure

In various embodiments, priority handling for LTE Sidelink communication may be facilitated. In order to define a preemption procedure, two types/states of D2D TXs may be defined:

Active State—In this state, so called active D2D TXs may have ongoing sidelink communication, e.g. transmit control and data in the PSCCH/PSSCH channels, sharing sidelink resources and evaluate preemption criteria in order to trigger the release of resources (PSCCH/PSSCH).

Preemption State—In this state, a set of candidate D2D TXs that have data for transmission and intend to compete for resources, may evaluate the preemption criteria to access sidelink resources and start communication over sidelink channels (e.g. PSCCH/PSSCH pools) and entering active state if criterion is satisfied.

Idle State—UE may be in this state if it does not have sidelink traffic or the preemption time is expected to be long due to long-term transmissions of higher priority UEs.

In various embodiments, in order to enter active state and start communication, the candidate D2D TXs (competing for sidelink resources) may monitor transmissions/resources of active D2D TXs (that already share resources) and optionally monitor transmissions/resources of candidate D2D TXs. If the preconfigured preemption criteria for access to resources is satisfied, the candidate D2D TXs may announce their own transmission (or intention to transmit) and perform sidelink transmission until the preemption criterion to release sidelink resources is satisfied. If this criterion is met, D2D TX may release sidelink resource and either stops transmissions if there is no sidelink traffic or enter the preemption state of a candidate D2D TX.

In order to switch from active to the preemption state, active D2D TXs may monitor transmissions/resources of candidate D2D TXs and may optionally monitor transmissions/resources of other D2D TXs. Active D2D TXs may release sidelink resources if preconfigured preemption condition to release resources is satisfied. The subsequent sidelink transmissions may be suspended until the preemption condition for new resource access is satisfied. In the latter case, candidate D2D TX may enter active state and become active D2D TX.

Figure 14:
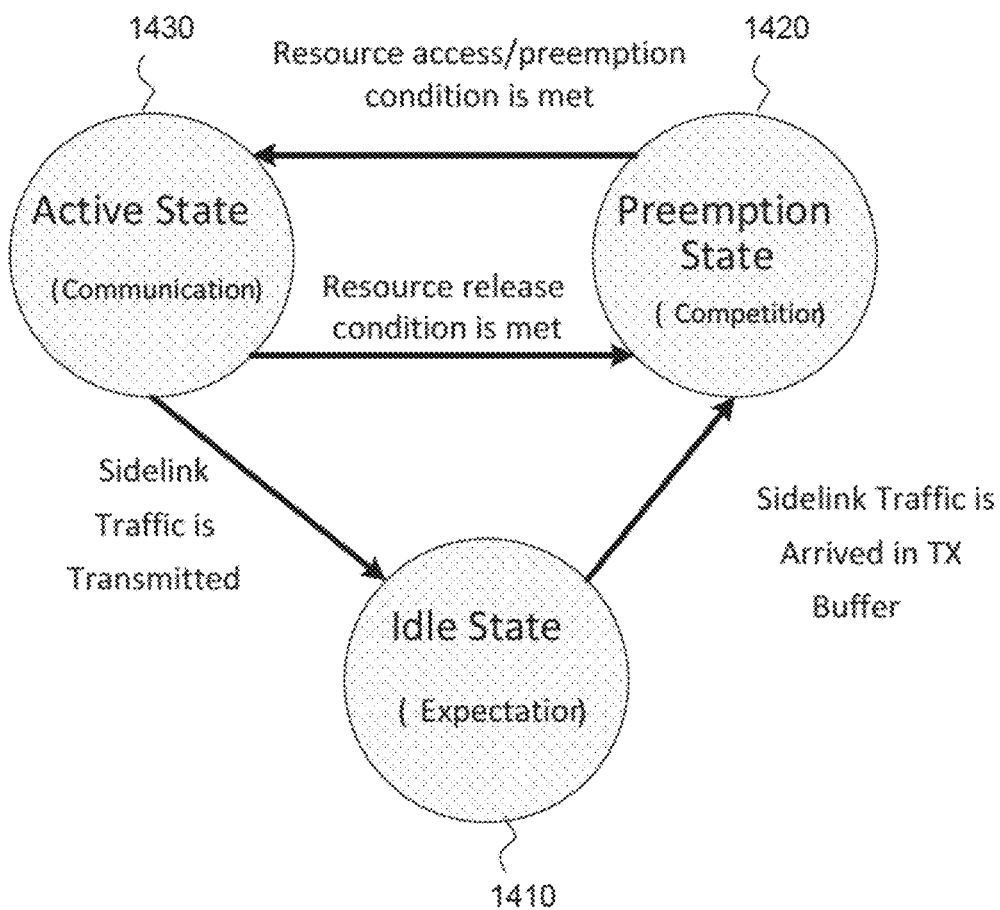
FIG. 14 schematically illustrates an example preemption state diagram.

FIG. 14 schematically illustrates an example preemption state diagram. According to this state diagram a UE performing D2D communication can transition between an idle state 1410, a preemption state 1420 and an active state 1430. A transition from the idle state to the preemption state can be made when SL traffic arrives in a previously empty transmit buffer. A transition from the preemption state to the active state can be made when either a resource access condition or a preemption condition is met by the UE. A transition is made from the active state 1430, in which data is transmitted by the UE, to the idle state 1410 when all of the SL traffic in the buffer has already been transmitted. A transition from the active state 1430 to the preemption state 1420 can be made when a resource release condition is met.

Preemption Criteria/Condition

In various embodiments, in order to enable priority handling in LTE Rel.13, different preemption criteria to access and release sidelink transmission resources may be configured.

Criteria to Access Resources

In various embodiments, there may be different conditions/criteria for resource access. Simple criteria such as amount of active D2D TXs (UEs) with equal and/or higher priority may be used to enable priority handling. The more sophisticated criteria may be configured to address the problem of collision and fair resource sharing. In various embodiments, depending on the design target different criteria and D2D TX behavior may be supported based on one of the following metrics.

Medium Activity (Amount of High Priority D2D TXs). The amount of active D2D transmissions with equal or higher priority may be used to characterize the medium utilization by higher priority transmissions. For instance, the amount of equal and/or higher priority transmissions compared with pre-configured threshold value $N_{A-TX}$ may be used as a condition to access resources. The value $N_{A-TX}$ may be defined per priority level or for all higher priority levels above a given priority. In the 1$^{st}$ case, the preemption condition can be satisfied for each of the higher priority levels. In addition, the SL-RSRP (reference signal received power) or SL-RSSI (received signal strength indication) threshold may be configured in order to check the received power level from active D2D transmitters and decide on resource access. This procedure assumes that each D2D TX (active and/or candidate) signals its own transmission priority either explicitly or implicitly. The value of $N_{A-TX}$ may be configurable and belong to the set from zero to +infinity, depending on the desired priority handling behavior. The configuration of the $N_{A-TX}$ may control how many UEs of equal and/or higher priority may share the resources in order for given UE to enter active transmission state.

Resource Quota/Grant. For fair resource usage, the pre-emption criteria may be modified to reflect resource utilization (e.g. amount of resources consumed over certain time interval). In a simple scenario, it may be a 1-bit indication whether the resource quota (e.g. max resource quota) was consumed or not. The D2D TXs that spent their resource quotas may be primary candidates to enter preemption state. These UEs may release resources, if the condition to release resources is satisfied. In a simple example, the resource quota may be defined as a max time interval to be in active D2D TX state. Alternatively, the actual amount of resources used for transmission by D2D TX over given time interval may be used. In other embodiments, the amount of transmitted bits (amount of transmitted data) may be used for preemption. In general, different resource quotas may be associated with different priority levels, in order to give preferential resource access to higher priority transmissions.

Resource quota and medium activity. A combination of the resource quota and medium activity indicators/metrics may be used in priority handling procedure to enable fair resource utilization among UEs with the same priority levels. For instance, active UE that consumed its resource quota may release resources if new candidate D2D TX with the same priority level is detected and the total amount of potential TXs exceeds the predefined number.

Criteria to Release Resources

Similar to the condition for access to resources there may be different preemption conditions to release transmission resources.

Medium Activity (Amount of High Priority D2D TXs) The simple criteria to release resources may be the condition when the total number of active D2D TXs and candidate TXs with equal or higher priority exceeds the predefined number ($N_{R-TX}$). In this case, the UE with lower priority may release transmission resources.

Resource Quota Similar to the criteria for access to resources, the resource quota may be used to release resources. The release of resources ensures fair resource usage among UEs with the same priority level. For instance, the UE that spent the resource quota may release resource if the number of D2D TXs (both active and candidate) exceeds the predefined number, i.e. new candidate with the same priority level attempts to access resources.

Resource quota and medium activity The combination of the resource quota and medium activity indicators/metrics may be used in priority handling procedure for resource release.

Collision Handling

A collision problem may exist in active and preemption states. In active state, it may be handled by random resource selection or by special procedure for resource selection. The preemption state may be based on probabilistic access and random resource selection. Alternatively, similar procedures as used for active D2D transmissions may be applied to enter and release resources of the pre-emption state.

Priority Indication

In order to monitor medium activity, in various embodiments, information about priority level of D2D transmissions may be signaled by D2D TXs. The following approaches may be used to indicate the priority level over sidelink.

Explicit PSCCH Signaling. Signaling of the transmission priority over PSCCH resources. For Rel.12 sidelink transmission mode 2, there are 11 bits of timing advance indication $I_{TAI}$ field of SCI Format 0, which is set to 0 for Rel.12 UEs. Part of these bits (e.g. 2, 3 or 4 bits) may be used for indication of priority level. Given that Rel.12 UEs access the medium without any priority rules, the priority 0 may be assumed as the highest priority. In this case, the SCI format 0 may be reused. In other option, the new SCI format (e.g. SCI Format X) and/or physical structure may be defined to carry priority.

PSCCH Resource Association (Implicit Signaling). In this case, the PSCCH resource index within PSCCH resource pool may be associated with the transmission priority level, i.e. priority level is a function of PSCCH resource index ($n_{PSCCH}$).

Higher layer signaling. In general the priority indication may be encoded into the higher layer messages, however this procedure is not attractive since may utilize all UEs to decode data from all active D2D TXs.

Scrambling of PSCCH Cyclic Redundancy Check (CRC) with priority level. In this case, the receiving UE can test several hypotheses corresponding to different priorities when checking CRC. Since the number of different priorities is limited, the complexity of this check may be low. This method may not be backward compatible for Rel.12 UEs in terms of transmission/reception.

Sidelink Resource Utilization Signaling

There are two types of sidelink resource utilization signaling used in preemption procedure:

eNodeB configuration signaling. For any sidelink resource pool and/or priority level, eNodeB may configure the maximum and/or minimum resource quotas. This additional signaling may be a part of the sidelink resource pool configuration and broadcasted in SIB18 or any other higher layer signaling. Additionally, this information may be pre-configured. In addition, eNodeB may configure resource grant settings in order to control the max and/or min amount of resources that may be used by the D2D TX with given priority within single SCI period.

D2D transmitter indication. D2D TXs may indicate a portion of the resource quota that was consumed up to the current moment. In a simplified scenario, D2D TX may indicate using single bit whether the max resource quota was utilized or not. This indication may be transmitted over PSCCH channel using similar options as defined in the previous section. In another embodiments the D2D TX may monitor its own resource utilization and make decision based on criteria to access/release resources.

Sidelink Resource Selection

In various embodiments, the random resource selection subject to resource grant constraints for given priority may be used for sidelink communication. Alternatively, in order to reduce PSCCH collisions UE may monitor a PSCCH pool and always select the resources not occupied by other D2D TXs. In order to reduce collision problem in PSSCH the PSCCH and PSSCH resources may be associated with each other. This mechanism may be enabled if resource grant size is configured.

Combination of Sensing and Probabilistic Method

In various embodiments, the preemption methods described above may be used in combination to better address the problems of priority handling, collision and fair resource utilization in different applications.

In this approach the UE may first monitor/sense the current usage of resources, for example by receiving PSCCH. Based on the priority of the pending transmission, and the information obtained by monitoring/sensing the current resource usage the UE may calculate a transmission probability, and depending on the probability then the UE will determine whether it may start to transmit. In various embodiments, the transmission probability may be dynamic and respond to the current usage of resources in contrast to the fixed transmission probability described in the pure probabilistic method described above. If the monitoring/sensing determines that the current resource usage is low, then the probability of transmission may be high. The calculation of the transmission probability could include some or all of the various metric described above in section entitled "Criteria to Access Resources".

In various embodiments, when the UE stops transmitting as it has transmitted all data in its buffer and then more data arrives, the UE may perform the monitoring/sensing and the probability based decision again before it resumes transmission. If the UE has not transmitted all data in its buffer then after transmitting for a pre-determined period of time (e.g. a predetermined number of SCI periods), the UE may stop transmitting and perform the monitoring/sensing and the probability based decision again before it continues transmission.

If the UE, on using the probability to determine whether it may transmit, determines that it cannot start transmission, it may wait for a predetermined time and then perform the monitoring/sensing and the probability based decision again before it may start transmission.

Timescales for Priority Handling

In LTE Rel.12, each D2D TX transmits control information in one of the resources within PSCCH indicating L1 parameters (e.g. Modulation and Coding Scheme (MCS) index—$I_{MCS}$, time resource pattern for transmission—$I_{TRP}$, frequency allocation and frequency hopping parameters) for the subsequent data transmission within PSSCH. The PSCCH and PSSCH resource pools are linked with each other and each UE may randomly select the PSCCH/PSSCH resource (in case of sidelink transmission Mode 2) or may use the resource assigned by eNodeB (in case of Mode 1). In order to enable priority handling, different timescales for preemption procedure may be enabled to better fit different traffic patterns and application. The selection of the timescale may be pre-configured by eNodeB or adaptively selected by UEs in autonomous mode based on medium activity factors and applications.

Fast Preemption (Short Priority Handling Timescale 40/80/160/320 ms)

The fast preemption procedure may assume that priority handling is enabled within SCI period. This preemption procedure may be used in scenarios where relatively small packets with variable priorities arrive at the SCI period timescale or even more frequently. Alternatively, this procedure may be reasonable under assumption of the congested environment where many UEs have different priorities and benefit from immediate access to the resources with low latency target criteria. One of the options to enable fast preemption procedure is to use time ordered priority mapping to PSCCH resources.

Time Ordered Priority Mapping to PSCCH Resources

In order to enable priority handling, the PSCCH resource pool may be divided into multiple subsets of resources associated with different priority levels.

The Rel.12 D2D TXs randomly select the PSCCH resource for transmission, each resource indicates two transmission opportunities, in different time and frequency instances. For Rel.13 UEs, the PSCCH resource selection rule may be changed. For instance, UEs with higher priority traffic may be configured to transmit ahead of UEs with the lower priorities. In order to define such behavior the PSCCH resources may be configured and associated with priorities in descending in time order (i.e. higher priority traffic can be associated with earlier transmission times).

Figure 15:
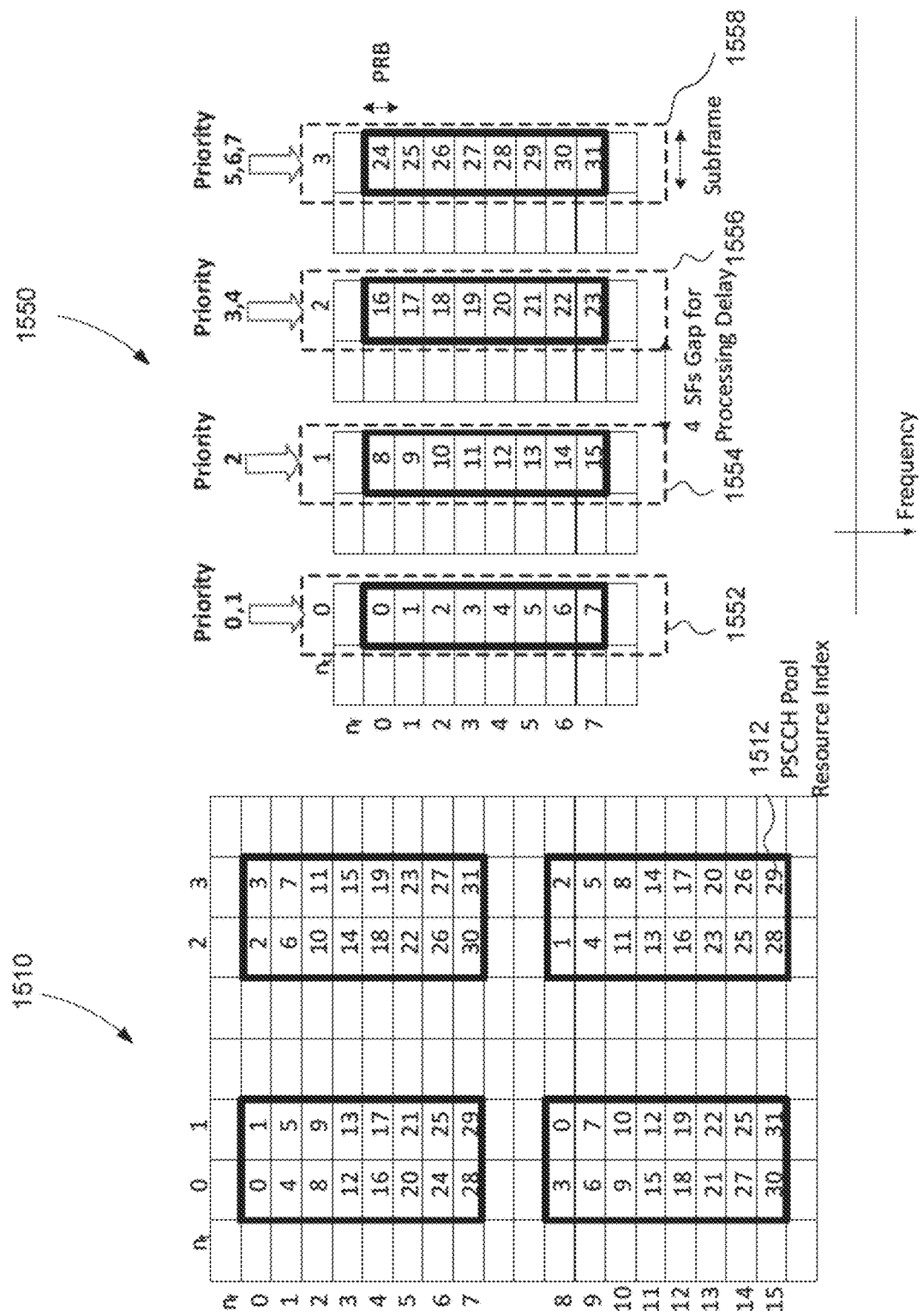
FIG. 15 schematically illustrates an example PSCCH resource mapping and time ordered priority association of PSCCH resources.

FIG. 15 schematically illustrates an example PSCCH resource mapping and time ordered priority association of PSCCH resources. A PSSCH resource mapping 1510 in FIG. 15 shows how different PSCCH resource pool indices 1512 are mapped to different PSCCH time nt and frequency of resources. An individual resource pool index 1512 corresponds to one subframe on the time axis by one PRB on the frequency axis. A time ordered priority of PSCCH resources is shown in 1550 on FIG. 15. There is a four subframe gap in this example for processing delay between consecutive ones of the four groups of resources. A first resource group 1552 corresponding to nt=0 has priority values 0,1; a second resource group 1554 corresponding to nt=1 has a priority value 2; a third resource group 1556 corresponding to nt=2 has priority values 3,4; a fourth resource group 1558 corresponding to nt=3 has priority values 5,6,7.

According to this procedure, all UEs monitor the PSCCH pool and UEs with higher priority may access the resources ahead of lower priority UEs. Therefore, UEs with lower priority may monitor the PSCCH and if preemption condition is satisfied for given SCI period, they may suspend the transmission. Depending on the PSCCH resource pool configuration there may be not enough time for the PSCCH processing, before making decision to transmit given that the current assumption is 4 ms processing delay (i.e. 4 subframes). Another change that can be made is a new resource mapping rule in the PSCCH pool: such as for example single transmission within a PSCCH pool and simplification of the PSCCH resource index mapping to PSCCH pool resources (to enable time ordered priority transmission).

Mid-Fast Preemption (Medium Priority Handling Timescale—multiple of 40/80/160/320 ms)

The mid-fast preemption procedure may be used when single packet transfer session over sidelink channel is relatively long, e.g. multiple of SCI periods. In this case, the dedicated PSCCH resources may be allocated and used in preemption procedure. The following options may be used:

Option 1: Single PSCCH Pool Configuration for Preemption and Communication

In various embodiments, this option may be implemented in different ways. According to one embodiment Option 1A (see FIG. 16A), the preemption cycle may be specified, which may be a multiple of SCI periods. In this case, different time instances of PSCCH pool may be used for regular sidelink communication or for priority handling. Another alternative (Option 1B) is to allocate the subset of PSCCH resources within PSCCH pool used for preemption. In both options, candidate D2D TXs may transmit in preemption resources and indicate priority related information, while the active D2D TXs use other resources for regular communication. The Option 1A may provide time multiplexing capabilities for transmission and reception of different UEs types so that they may transmit and receive on orthogonal in time resources. Option 1B may not fully resolve the half-duplex issue, however the preemption may still be enabled in case of probabilistic resource selection. In this case, the preemption decision to release/access resources is likely to take a longer time.

Figure 16A:
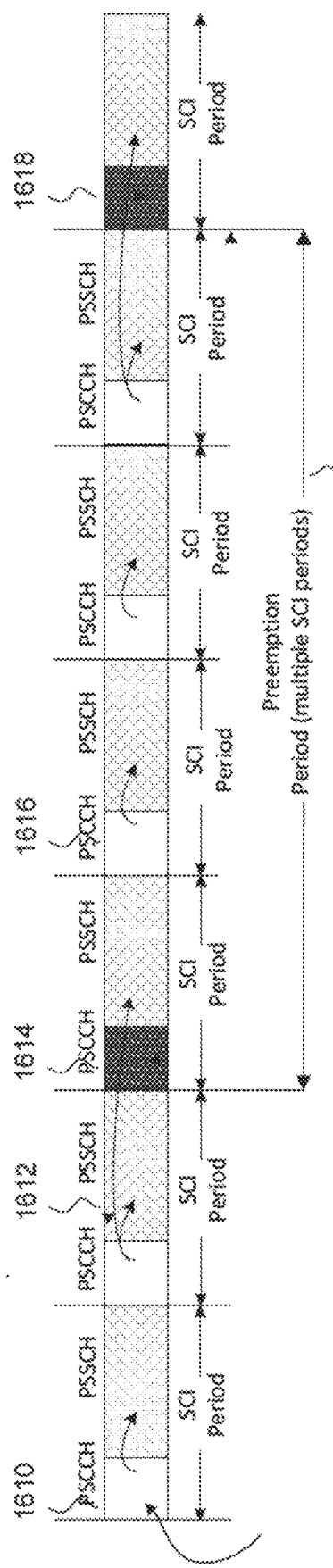
FIG. 16A schematically illustrates an embodiment in which a single PSCCH pool is used for communication and pre-emption.
Figure 16B:
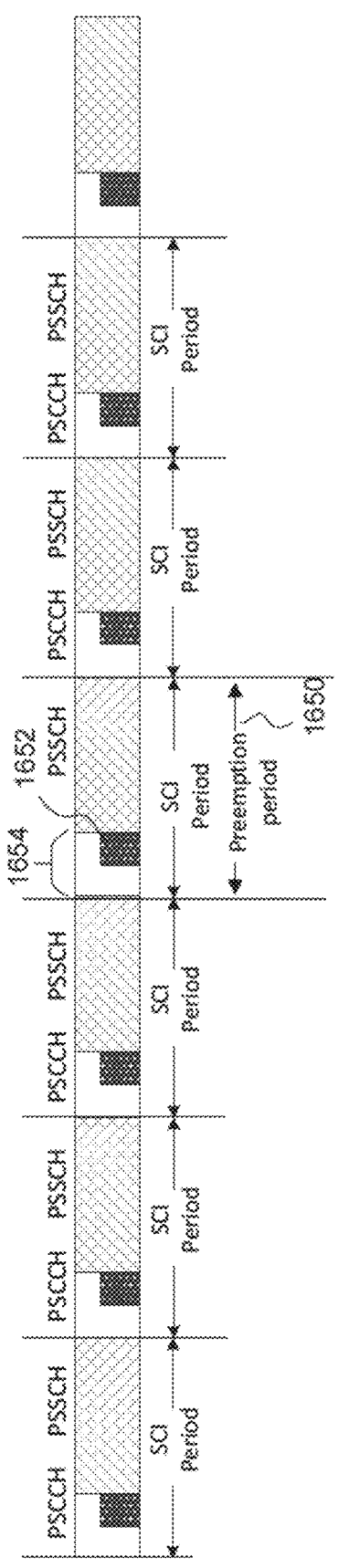
FIG. 16B schematically illustrates an embodiment in part of the PSCCH pool within each sidelink control information (SCI) period is used for pre-emption.

FIG. 16A schematically illustrates an embodiment in which a single PSCCH pool is used for communication and preemption and in which a preemption cycle over multiple PSCCH pool is introduced. Referring to FIG. 16A, in a first PSCCH field 1610 of the first illustrated SCI period, active D2D transmitters (UEs) signal L1 (PHY) parameters of transmission within the PSSCH pool and parameters for priority handling, such as priority level and resource quota status. Meanwhile, any candidate D2D transmitter UEs monitor the PSCCH control data and evaluate preemption criteria to access resources. In a PSSCH 1612 of the next SCI period, the active UE continues transmission with the same L1 parameters if a preemption condition is not met. In a PSCCH field 1614 of the third SCI period higher priority UEs and/or transmissions enter an active state if a preemption condition to access resources is satisfied. In this case, within the same PSCCH 1614, candidate D2D transmitters announce their control of transmission if preemption criteria are satisfied by, for example, requesting resources using SCI format 0 or a new SCI format X and indicate a priority level (transmission and/or per-packet priority level). Meanwhile in PSCCH 1614, active D2D transmitters monitor the PSCCH resources to evaluate preemption criteria to release resources. In a PSCCH field 1616 of a fourth SCI period, lower priority UEs or transmissions enter a preemption state if a condition to release resources is satisfied. In a PSCCH field 1618 of a seventh SCI period, dedicated PSCCH resources are used for a preemption procedure. For example, the dedicated PSCCH resources can be used for announcements of candidate D2D transmitters. FIG. 16A shows a preemption period 1620 comprising four SCI periods and spanning a time from when higher priority UEs/transmitters enter an active state at 1614 to when dedicated PSCCH resources are allocated at 1618. FIG. 16B schematically illustrates an embodiment in which a single PSCCH pool is used for communication and in which a part of the PSCCH pool within each SCI period is used for preemption. FIG. 16B shows a preemption period 1650 corresponding to a single SCI period and shows a portion 1652 of a PSCCH filed 1654 in each SCI period being allocated for preemption.

Option 2: Additional PSCCH Pool Dedicated to Preemption (See FIG. 17)

Figure 17:
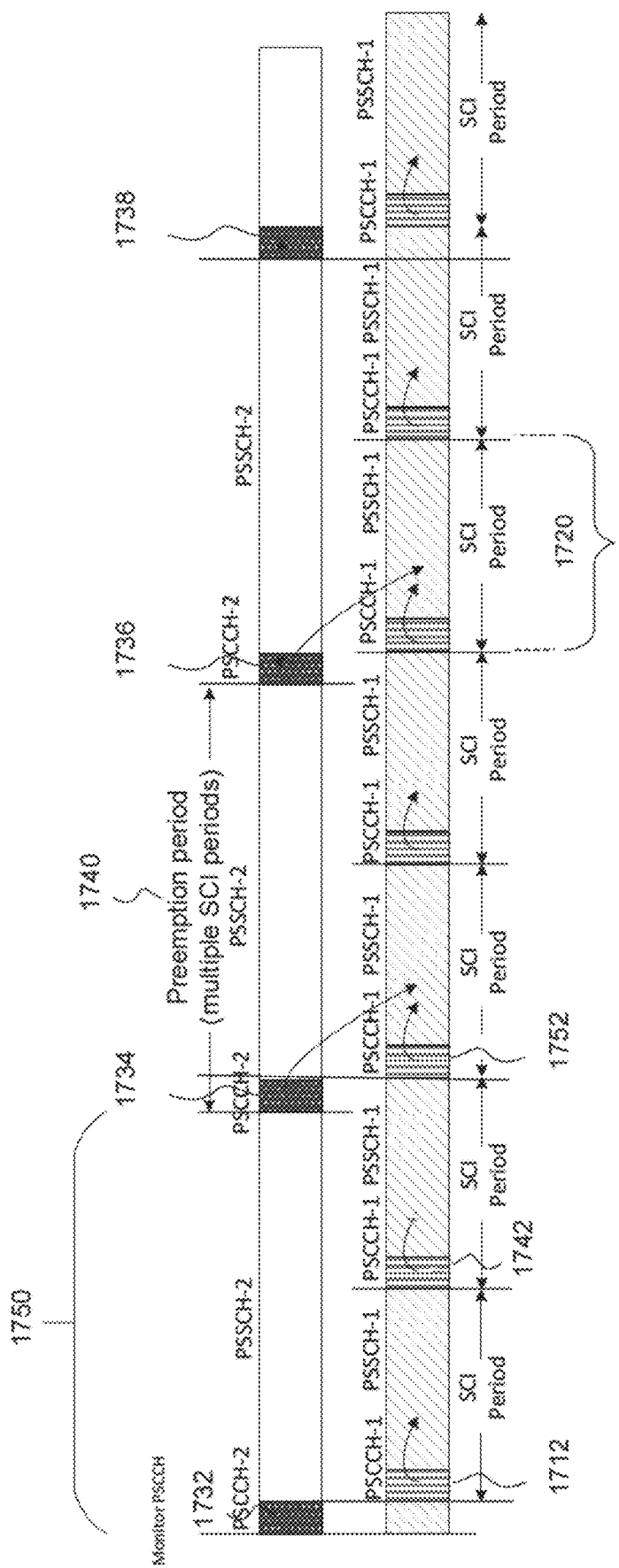
FIG. 17 schematically illustrates an example preemption scheme in which two PSCCH pools are linked to a single PSSCH pool.

In case of Option 2, two PSCCH pools may be linked to the same PSSCH pool as shown in FIG. 17. The 1$^{st}$ PSCCH pool (PSCCH-1) is used for regular D2D communication and the 2$^{nd}$ PSCCH pool (PSCCH-2) is used for preemption procedure.

Active D2D TXs monitor preemption pool to evaluate preemption criteria for resource release, while the candidate D2D TXs evaluate preemption criteria for resource access.

FIG. 17 schematically illustrates an example preemption scheme in which two PSCCH pools are linked to a single PSSCH pool. The two PSCCH pools are PSCCH-1 and PSCCH-2. The PSCCH-1 pool is used together with the corresponding PSSCH-1 for regular communication whereas the PSCCH-2 pool is specifically allocated to assist in the preemption procedure. The data unit 1712 at the beginning of the first SCI period of the regular communication resource pool is part of a periodically repeated PSCCH-1 resource, with the repeat frequency being the SCI period 1720. The second resource pool is arranged to have a periodicity in allocation of the PSCCH-2 data units corresponding to multiple SCI units of the first pool. In this particular example, the PSCCH-2 resource unit is provided immediately in advance on the time axis of every alternate PSCCH-1 resource unit, so in this case a preemption period 1740 is two SCI periods.

In the first resource pool PSCCH-1/PSSCH-1, in the PSCCH-1 field of a SCI period (e.g. in the PSCCH-1 entity 1742), active D2D transmitters can signal L1 (PHY) parameters of transmission within the PSSCH-1 pool or can signal priority preemption information or can signal both L1 parameters and priority preemption information. The priority preemption information can be, for example, per-packet priority value(s) and/or transmission priority value(s) and/or resource quota status. In the same PSCCH-1 entity 1742, candidate D2D transmitters monitor the PSCCH and evaluate preemption criteria to access resources. Meanwhile, in the corresponding PSCCH-2 resource pool time interval 1750, candidate transmitters announce their control transmission if preemption criteria are satisfied, for example, by requesting resources using SCI Format 0 or the new SCI-format X and/or by signaling priority preemption information. In the next PSCCH-2 filed 1734, higher priority UEs or higher priority transmissions enter an active state if one or more preemption condition(s) to access resources is satisfied. In a PSCCH-1 data entity 1752 of the third illustrated SCI period, lower priority UEs or transmitters transition from an active state to a preemption state if condition(s) for them to release resources have been satisfied. However, if a preemption condition is not met by any new higher priority UEs/transmitters the transmission of data is continued with the same L1 parameters (e.g. the same transmission priority value) in the next SCI period.

Option 3: Single PSCCH Pool for Use with Combination of Sensing and Probabilistic Transmission (See FIG. 18)

In case of Option 3, a single PSCCH pool may be utilized. All UEs may monitor this pool before starting transmission. The resource activity determined from monitoring the pool may be used to determine the probability to start transmitting in the subsequent SCI period. If transmission is started it may continue for a maximum period equal to the Preemption Period before it may again monitor the PSCCH pool to determine a transmission probability. The Preemption Periods for different UEs may not be synchronized in time as different UEs may start the process by monitoring the PSCCH in any SCI period.

Figure 18:
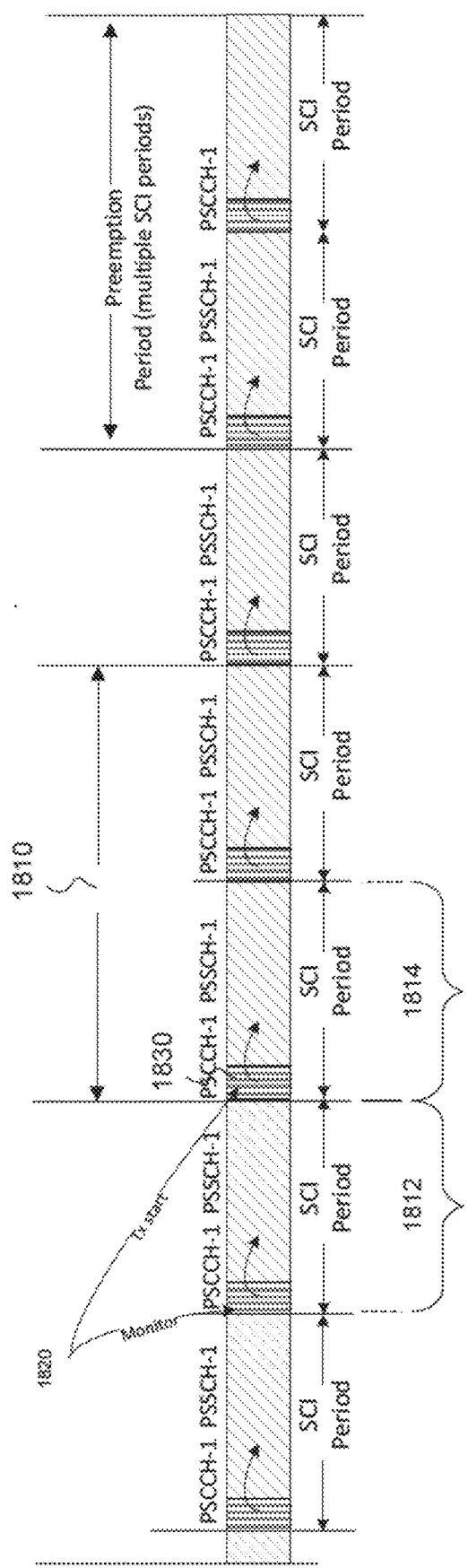
FIG. 18 schematically illustrates how a combination of sensing and probabilistic transmission can be implemented in a single PSCCH pool.

FIG. 18 schematically illustrates how a combination of sensing and probabilistic transmission can be implemented in a single PSCCH pool. Similarly to the FIG. 17 embodiment, a preemption period 1810 in the FIG. 18 embodiment is a plurality of SCI periods, in particular, two SCI periods in this example. In this embodiment, a UE having data for D2D transmission monitors or senses activity on the radio resources in one SCI period 1812. Based on the detected activity and a transmission priority, the UE decides whether or not to begin transmission. If a decision to transmit is made, then transmission starts in a subsequent SCI period 1814 and can continue until there is no data left in the transmission buffer or until the end of the preemption period, i.e. multiple SCI periods. The preemption period can be any number of SCI periods in other embodiments and is not limited to two SCI periods. If at the end of the preemption period a UE still has data left to transmit then it can interrupt transmission for one SCI period to perform monitoring and/or sensing again and, if appropriate, transmission can start again in the subsequent SCI period.

Slow Preemption (Long Priority Handling Timescale—Order of Seconds)

In this case, the priority handling mechanism operates over a timescale in the order of seconds. In this case either a mid-fast mechanism with a long period may be configured and/or higher layer mechanisms such as flow control to handle preemption may be used. Note that higher layer mechanisms may utilize the processing of all D2D transmission and thus cause significant power consumption. Therefore, the applicability of higher layer options may be limited to flow control within particular user group or application.

Compatibility with Rel.12 UEs

The preemption methods may be fully compatible in terms of reception with LTE Rel.12 UEs, however are different from the transmission perspective. Therefore in order to enable a reliable preemption mechanism it may be possible to use different resource pools for transmission of Rel.12 and Rel.13 UEs.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 19:
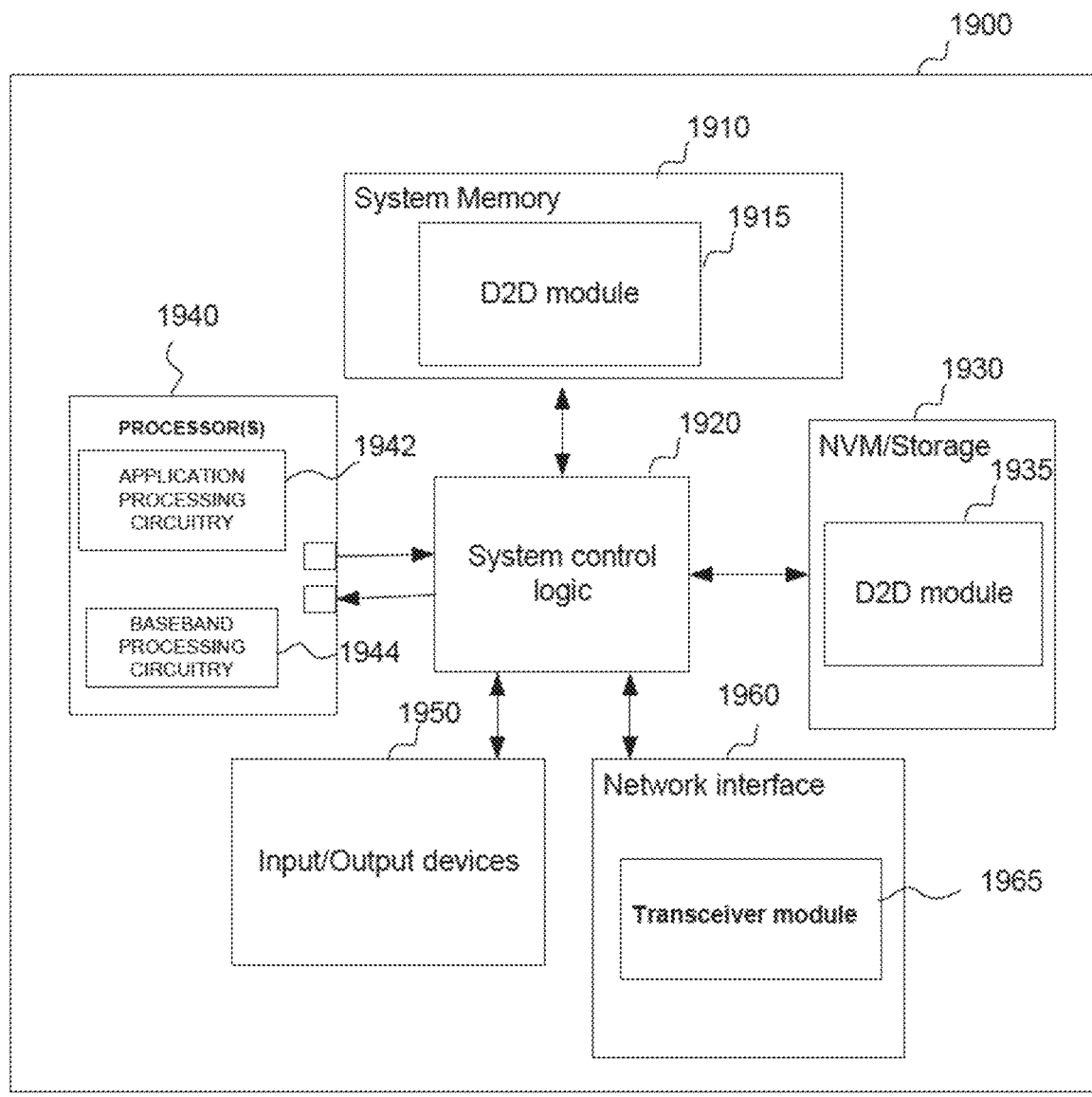
FIG. 19 illustrates an example system according to some embodiments.

FIG. 19 illustrates an example system 1900 according to some embodiments. System 1900 includes one or more processor(s) 1940, system control logic 1920 coupled with at least one of the processor(s) 1940, system memory 1910 coupled with system control logic 1920, non-volatile memory (NVM)/storage 1930 coupled with system control logic 1920, and a network interface 1960 coupled with system control logic 1920. The system control logic 1920 may also be coupled to Input/Output (I/O) devices 1950.

Processor(s) 1940 may include one or more single-core or multi-core processors. Processor(s) 1940 may include any combination of general-purpose processors and dedicated processors (e.g., graphics processors, application processors, baseband processors, etc.). Processor(s) 1940 may be operable to carry out the above described methods, using suitable instructions or programs (i.e. operate via use of processor, or other logic, instructions). The instructions may be stored in system memory 1910, as system memory portion (D2D module) 1915, or additionally or alternatively may be stored in NVM/storage 1930, as NVM instruction portion (D2D module) 1935. D2D modules 1915 and/or 1935 may include program instructions to cause a processor 1940 to generate or to allocate a per-packet priority to generated data packets in the application layer of the wireless network protocol stack and to cause one or more baseband processors to prioritize access to an LTE/LTE-A SL resource pool by mapping the per-packet priority from the application layer to a transmission priority in the physical layer and/or to a logical channel priority on the MAC layer of the protocol stack.

Processors(s) 1940 may be configured to execute the above described embodiments. The processor(s) can comprise one or more of application processing circuitry 1942 or baseband processing circuitry 1944. A transceiver module 1965 is arranged to transmit and/or receive wireless signals comprising the prioritization information according to the embodiments. It will be appreciated that the transmission prioritization functionality may be distributed or allocated in different ways across the system involving one or more of the processor(s) 1940, transceiver module 1965, system memory 1910 and NVM/storage 1930.

System control logic 1920 for one embodiment may include any suitable interface controllers to provide for any suitable interface to at least one of the processor(s) 1940 and/or to any suitable device or component in communication with system control logic 1920.

System control logic 1920 for one embodiment may include one or more memory controller(s) to provide an interface to system memory 1910. System memory 1910 may be used to load and store data and/or instructions, for example, for system 1900. System memory 1910 for one embodiment may include any suitable volatile memory, such as suitable dynamic random access memory (DRAM), for example.

NVM/storage 1930 may include one or more tangible, non-transitory or transitory computer-readable media used to store data and/or instructions, for example. NVM/storage 1930 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1930 may include a storage resource physically part of a device on which the system 1200 is installed or it may be accessible by, but not necessarily a part of, the device. For example, the NVM/storage 1930 may be accessed over a network via the network interface 1260.

System memory 1210 and NVM/storage 1930 may respectively include, in particular, temporal and persistent copies of, for example, the instructions portions 1915 and 1935, respectively. D2D modules 1915 and 1935 may include instructions that when executed by at least one of the processor(s) 1940 result in the system 1900 implementing one or more of methods of any embodiment, as described herein. In some embodiments, instructions 1915 and 1935, or hardware, firmware, and/or software components thereof, may additionally/alternatively be located in the system control logic 1920, the network interface 1960, and/or the processor(s) 1940.

The transceiver module 1965 provides a radio interface for system 1900 to communicate over one or more network(s) (e.g. wireless communication network) and/or with any other suitable device. The transceiver 1965 may perform the various communicating, transmitting and receiving described in the various embodiments, and may include a transmitter section and a receiver section. In various embodiments, the transceiver 1965 may be integrated with other components of system 1900. For example, the transceiver 1965 may include a processor of the processor(s) 1940, memory of the system memory 1910, and NVM/Storage of NVM/Storage 1930. Network interface 1960 may include any suitable hardware and/or firmware. Network interface 1960 may be operatively coupled to a plurality of antennas to provide a multiple input, multiple output radio interface. Network interface 1960 for one embodiment may include, for example, a network adapter, a wireless network adapter, a telephone modem, and/or a wireless modem. For example, where system 1900 is an eNodeB, network interface 1960 may include an Ethernet interface, an S1-Mobility Management Entity (MME) interface and/or an S1-U interface. The system 1900 of FIG. 19 may be implemented in a UE, but may alternatively be implemented in a vehicle, picocell, femtocell or relay node for the purposes of implementing prioritization of resource access in LTE/LTE-A D2D or ProSe to allow preferential access to traffic having higher priority to facilitate fair resource usage and a reduced number of collisions.

For one embodiment, at least one of the processor(s) 1940 may be packaged together with logic for one or more controller(s) of system control logic 1920. For one embodiment, at least one of the processor(s) 1940 may be packaged together with logic for one or more controllers of system control logic 1920 to form a System in Package (SiP). For one embodiment, at least one of the processor(s) 1940 may be integrated on the same die with logic for one or more controller(s) of system control logic 1920. For one embodiment, at least one of the processor(s) 1940 may be integrated on the same die with logic for one or more controller(s) of system control logic 1920 to form a System on Chip (SoC). Each of the processors 1940 may include an input for receiving data and an output for outputting data.

In various embodiments, the I/O devices 1950 may include user interfaces designed to enable user interaction with the system 1900, peripheral component interfaces designed to enable peripheral component interaction with the system 1900, and/or sensors designed to determine environmental conditions and/or location information related to the system 1900.

Figure 20:
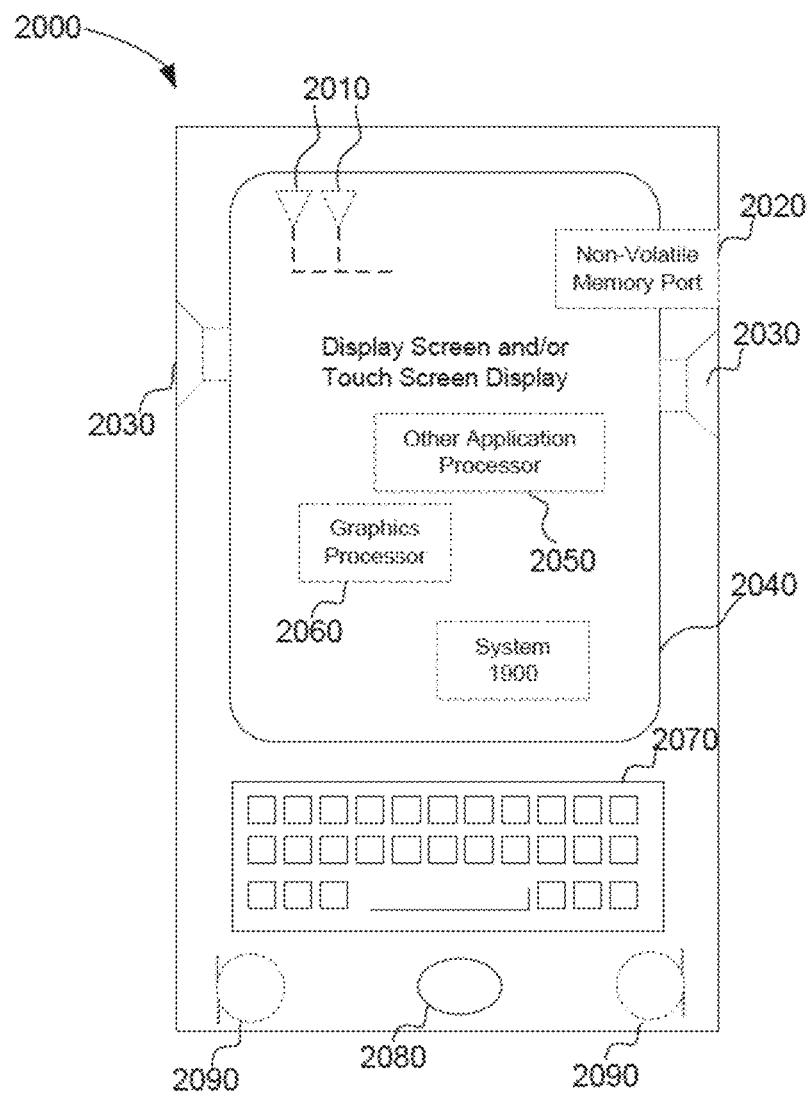
FIG. 20 shows an embodiment in which the system 1900 implements a wireless device.

FIG. 20 shows an embodiment in which the system 1900 implements a wireless device 2000, such as UE, a mobile station (MS), a mobile wireless device, a mobile communication device, a tablet, a handset, or other type of wireless device. The wireless device can include one or more antennas 2010 configured to communicate with a node, macro node, low power node (LPN), or, transmission station, such as a base station (BS), an evolved Node B (eNodeB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, Worldwide Interoperability for Microwave Access (WiMAX), High Speed Packet Access (HSPA), Bluetooth, and Wi-Fi. The device is capable of performing D2D communication with other proximal wireless devices both when in-coverage and out-of-coverage with respect to the wireless cellular network. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

The wireless device 2000 of FIG. 20 also provides an illustration of a microphone 2090 and one or more speakers 2030 that can be used for audio input and output from the wireless device. In various embodiments, the user interfaces could include, but are not limited to, a display 2040 (e.g., a liquid crystal display (LCD), a touch screen display, etc.), a speaker 2030, a microphone 2090, one or more cameras 2080 (e.g., a still camera and/or a video camera), a flashlight (e.g., a light emitting diode (LED) flash), and a keyboard 2070.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1960 to communicate with components of a positioning network, e.g., a global positioning system (GPS) satellite.

In various embodiments, the system 2000 may be a mobile computing device such as, but not limited to, a laptop computing device, a tablet computing device, a netbook, a mobile phone, etc. In various embodiments, system 2000 may have more or less components, and/or different architectures.

In embodiments, the implemented wireless network may be a 3GPP LTE-A wireless communication standard, which may include, but is not limited to releases 8, 9, 10, 11 and 12, or later, of the 3GPP's LTE-A standards.

Various techniques, or certain aspects or portions thereof, may take the form of program code (i.e., instructions) embodied in tangible media, such as floppy diskettes, Compact Disc Read Only Memories (CD-ROMs), hard drives, transitory or non-transitory computer readable storage medium, or any other machine-readable storage medium such that when the program code is loaded into and executed by a machine, such as a computer, the machine becomes an apparatus for practicing the various techniques according to the above described embodiments. In the case of program code execution on programmable devices such as a UE or a wireless device, the computing device may include a processor, digital signal processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read Only Memory (EPROM), flash drive, optical drive, magnetic hard drive, or other medium for storing electronic data.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that the functional units described in this specification have been labeled as units or modules or circuitry or logic, to highlight their implementation independence. Note that a module/unit/circuitry may be implemented, for example, as a hardware circuit comprising custom Very Large Scale Integration (VLSI) circuits or gate arrays, off-the-shelf semiconductors such as logic chips, transistors, or other discrete components. A module/unit/circuitry/logic may also be implemented in programmable hardware devices such as field programmable gate arrays (FPGAs), programmable array logic, programmable logic devices or the like. The module/unit/circuitry/logic may be general purpose processor circuitry configured by program code to perform specified processing functions, for example firmware. The module/units/circuitry/logic may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function. The modules/units/circuitry may be implemented in logic such as hardware logic elements, combinations of logic elements or other circuit components.

Modules/units/circuitry/logic may also be implemented in software for execution by various types of processors. An identified module or set of executable code may, for instance, comprise one or more physical or logical blocks of computer instructions, which may, for instance, be organized as an object, procedure, or function. Nevertheless, the executables of an identified module are not necessarily physically located together, but may comprise disparate instructions stored in different locations which, when joined logically together, comprise the module and achieve the stated purpose for the module.

Indeed, a module or set of executable code may be a single instruction, or many instructions, and may even be distributed over several different code segments, among different programs, and across several memory devices. Similarly, operational data may be identified and illustrated herein within modules, units or circuitry, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Figure 21:
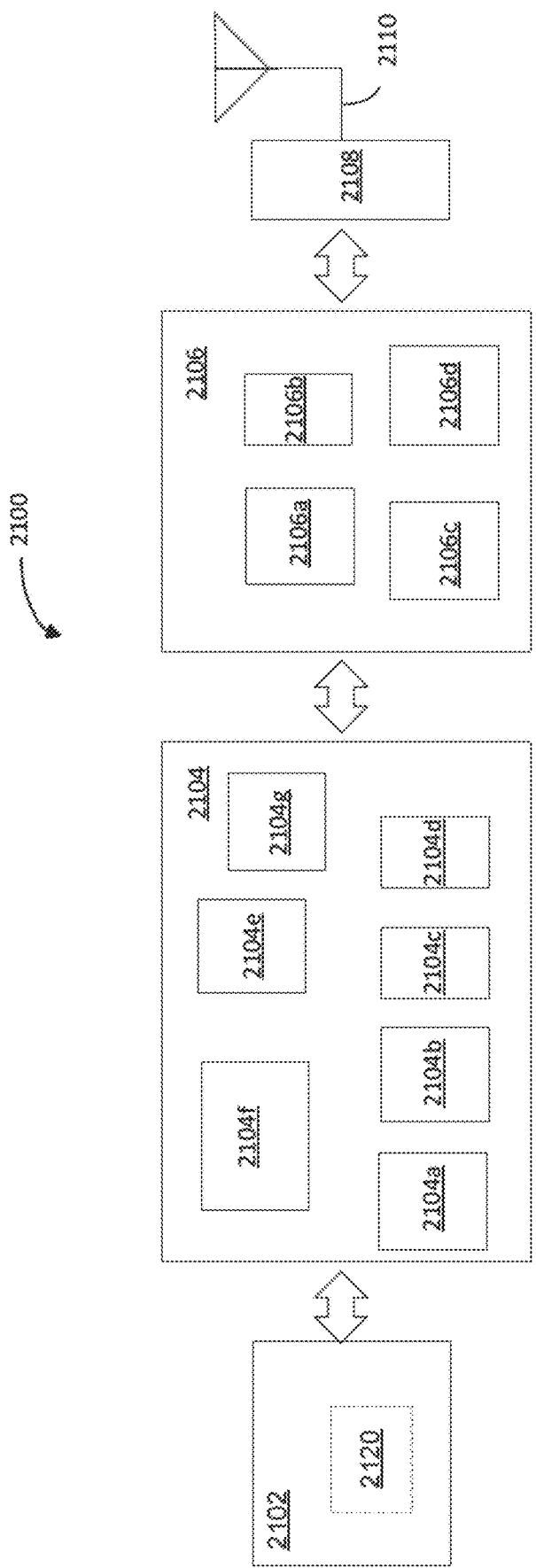
FIG. 21 illustrates, for one embodiment, example components of an electronic device.

Embodiments described herein may be implemented into a system using any suitably configured hardware and/or software. FIG. 21 illustrates, for one embodiment, example components of an electronic device 2100. In embodiments, the electronic device 2100 may be a UE, an eNodeB, and the like. In some embodiments, the electronic device 2100 may include application circuitry 2102, baseband circuitry 2104, Radio Frequency (RF) circuitry 2106, front-end module (FEM) circuitry 2108 and one or more antennas 2110, coupled together at least as shown. The application circuitry may optionally include resource configuring circuitry 2120 when the electronic device 2100 is an eNodeB. The resource configuring circuitry can be arranged to allocate LTE/LTE-A uplink resources to SL communications, to configure a resource quota for a UE to perform SL communication depending upon priority information and to signal to a UE the configured resource quota.

The application circuitry 2102 may include one or more application processors. For example, the application circuitry 2102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 2104 may include circuitry such as, but not limited to, one or more single-core or multi-core processors. The baseband circuitry 2104 may include one or more baseband processors and/or control logic to process baseband signals received from a receive signal path of the RF circuitry 2106 and to generate baseband signals for a transmit signal path of the RF circuitry 2106. Baseband processing circuitry 2104 may interface with the application circuitry 2102 for generation and processing of the baseband signals and for controlling operations of the RF circuitry 2106. For example, in some embodiments, the baseband circuitry 2104 may include a second generation (2G) baseband processor 2104a, third generation (3G) baseband processor 2104b, fourth generation (4G) baseband processor 2104c, and/or other baseband processor(s) 2104d for other existing generations, generations in development or to be developed in the future (e.g., fifth generation (5G), 6G, etc.). The baseband circuitry 2104 (e.g., one or more of baseband processors 2104a-d) may handle various radio control functions that enable communication with one or more radio networks via the RF circuitry 2106. The radio control functions may include, but are not limited to, signal modulation/demodulation, encoding/decoding, radio frequency shifting, etc. In some embodiments, modulation/demodulation circuitry of the baseband circuitry 2104 may include Fast-Fourier Transform (FFT), precoding, and/or constellation mapping/demapping functionality. In some embodiments, encoding/decoding circuitry of the baseband circuitry 2104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2104 may include elements of a protocol stack such as, for example, elements of an evolved universal terrestrial radio access network (EUTRAN) protocol including, for example, PHY, MAC, RLC, PDCP, and/or RRC elements. A central processing unit (CPU) 2104e of the baseband circuitry 2104 may be configured to run elements of the protocol stack for signaling of the PHY, MAC, RLC, PDCP and/or RRC layers. In some embodiments, the baseband circuitry may include one or more audio digital signal processor(s) (DSP) 2104f. The audio DSP(s) 2104f may be include elements for compression/decompression and echo cancellation and may include other suitable processing elements in other embodiments.

The baseband circuitry 2104 may further include memory/storage 2104g. The memory/storage 2104g may be used to load and store data and/or instructions for operations performed by the processors of the baseband circuitry 2104. Memory/storage for one embodiment may include any combination of suitable volatile memory and/or non-volatile memory. The memory/storage 2104g may include any combination of various levels of memory/storage including, but not limited to, read-only memory (ROM) having embedded software instructions (e.g., firmware), RAM (e.g., DRAM), cache, buffers, etc. The memory/storage 2104g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 2104 and the application circuitry 2102 may be implemented together such as, for example, on a SoC.

In some embodiments, the baseband circuitry 104 may provide for communication compatible with one or more radio technologies. For example, in some embodiments, the baseband circuitry 2104 may support communication with EUTRAN and/or other wireless metropolitan area networks (WMAN), WLAN, WPAN. Embodiments in which the baseband circuitry 2104 is to support radio communications of more than one wireless protocol may be referred to as multi-mode baseband circuitry.

RF circuitry 2106 may enable communication with wireless networks using modulated electromagnetic radiation through a non-solid medium. In various embodiments, the RF circuitry 2106 may include switches, filters, amplifiers, etc. to facilitate the communication with the wireless network. RF circuitry 2106 may include a receive signal path which may include circuitry to down-convert RF signals received from the FEM circuitry 2108 and provide baseband signals to the baseband circuitry 2104. RF circuitry 2106 may also include a transmit signal path which may include circuitry to up-convert baseband signals provided by the baseband circuitry 2104 and provide RF output signals to the FEM circuitry 2108 for transmission.

In some embodiments, the RF circuitry 2106 may include a receive signal path and a transmit signal path. The receive signal path of the RF circuitry 2106 may include mixer circuitry 2106a, amplifier circuitry 2106b and filter circuitry 2106c. The transmit signal path of the RF circuitry 2106 may include filter circuitry 2106c and mixer circuitry 2106a. RF circuitry 2106 may also include synthesizer circuitry 2106d for synthesizing a frequency for use by the mixer circuitry 2106a of the receive signal path and the transmit signal path. In some embodiments, the mixer circuitry 2106a of the receive signal path may be to down-convert RF signals received from the FEM circuitry 2108 based on the synthesized frequency provided by synthesizer circuitry 2106d. The amplifier circuitry 2106b may be to amplify the down-converted signals and the filter circuitry 2106c may be a low-pass filter (LPF) or band-pass filter (BPF) configured to remove unwanted signals from the down-converted signals to generate output baseband signals. Output baseband signals may be provided to the baseband circuitry 2104 for further processing. In some embodiments, the output baseband signals can in some cases be zero-frequency baseband signals. In some embodiments, mixer circuitry 2106a of the receive signal path may comprise passive mixers, although the scope of the embodiments is not limited in this respect.

In some embodiments, the mixer circuitry 2106a of the transmit signal path may be to up-convert input baseband signals based on the synthesized frequency provided by the synthesizer circuitry 2106d to generate RF output signals for the FEM circuitry 2108. The baseband signals may be provided by the baseband circuitry 2104 and may be filtered by filter circuitry 2106c. The filter circuitry 2106c may include a LPF, although the scope of the embodiments is not limited in this respect.

In some embodiments, the mixer circuitry 2106a of the receive signal path and the mixer circuitry 2106a of the transmit signal path may include two or more mixers and may be arranged for quadrature down-conversion and/or up-conversion respectively. In some embodiments, the mixer circuitry 2106a of the receive signal path and the mixer circuitry 2106a of the transmit signal path may include two or more mixers and may be arranged for image rejection (e.g., Hartley image rejection). In some embodiments, the mixer circuitry 2106a of the receive signal path and the mixer circuitry 2106a may be arranged for direct down-conversion and/or direct up-conversion, respectively. In some embodiments, the mixer circuitry 2106a of the receive signal path and the mixer circuitry 2106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2106 may include analog-to-digital converter (ADC) and digital-to-analog converter (DAC) circuitry and the baseband circuitry 2104 may include a digital baseband interface to communicate with the RF circuitry 2106.

In some dual-mode embodiments, a separate radio Integrated Circuit (IC) circuitry may be provided for processing signals for each spectrum, although the scope of the embodiments is not limited in this respect.

In some embodiments, the synthesizer circuitry 2106d may be a fractional-N synthesizer or a fractional N/N+1 synthesizer, although the scope of the embodiments is not limited in this respect as other types of frequency synthesizers may be suitable. For example, synthesizer circuitry 2106d may be a delta-sigma synthesizer, a frequency multiplier, or a synthesizer comprising a phase-locked loop with a frequency divider.

The synthesizer circuitry 2106d may be to synthesize an output frequency for use by the mixer circuitry 2106a of the RF circuitry 2106 based on a frequency input and a divider control input. In some embodiments, the synthesizer circuitry 2106d may be a fractional N/N+1 synthesizer.

In some embodiments, frequency input can, in some cases, be provided by a voltage controlled oscillator (VCO). Divider control input may be provided by either the baseband circuitry 2104 or the applications processor 2102 depending on the desired output frequency. In some embodiments, a divider control input (e.g., N) may be determined from a look-up table based on a channel indicated by the applications processor 2102.

Synthesizer circuitry 2106d of the RF circuitry 2106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2106d may be to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2106 may include an IQ/polar converter.

FEM circuitry 2108 may include a receive signal path which may include circuitry to operate on RF signals received from one or more antennas 2110, amplify the received signals and provide the amplified versions of the received signals to the RF circuitry 2106 for further processing. FEM circuitry 2108 may also include a transmit signal path which may include circuitry to amplify signals for transmission provided by the RF circuitry 2106 for transmission by one or more of the one or more antennas 2110.

In some embodiments, the FEM circuitry 2108 may include a transmission/reception (TX/RX) switch to switch between transmit mode and receive mode operation. The FEM circuitry may include a receive signal path and a transmit signal path. The receive signal path of the FEM circuitry 2108 may include a low-noise amplifier (LNA) to amplify received RF signals and provide the amplified received RF signals as an output (e.g., to the RF circuitry 2106). The transmit signal path of the FEM circuitry 2108 may include a power amplifier (PA) to amplify input RF signals (e.g., provided by RF circuitry 2106), and one or more filters to generate RF signals for subsequent transmission (e.g., by one or more of the one or more antennas 2110).

In some embodiments, the electronic device 2100 may include additional elements such as, for example, memory/storage, display, camera, sensor, and/or I/O interface.

In embodiments, the electronic device 2100 may be configured to perform one or more processes, techniques, and/or methods as described herein or in portions thereof.

Embodiments can be realized according to any of the following clauses or examples taken jointly and severally in any and all permutations:

EXAMPLES

Example 1 may include a method of the ProSe per-packet priority support in sidelink communication for eNodeB controlled and UE autonomous sidelink transmission modes that may include at least one of the following functions:
  Mapping of Packet Priority to Transmission Priority
  Preemption handling methods with configurable operation timescales Example 2 may include the method of example 1 or some other example herein, wherein the mapping of packet priority to the sidelink transmission priority may include priority mapping function(s) that translate the upper layer packet priority to the transmission priority utilized by lower layers, that is reflected in the preferential access to sidelink spectrum resources for the higher priority packets Example 3 may include the method of example 2 or some other example herein, wherein priority mapping function may be a one to one mapping function from the higher layer ProSe per-packet priority to sidelink transmission priority Example 4 may include the method of example 1 or some other example herein, wherein in case of eNodeB controlled sidelink transmission mode 1, UE (sidelink transmitter) may report per-packet priority and/or sidelink transmission priority levels and the corresponding TX buffer information to eNodeB using buffer status report and eNodeB utilizes this information to schedule sidelink transmissions from multiple UEs (sidelink transmitters)

Example 5 may include the method of example 1 or some other example herein, wherein in case of eNodeB controlled sidelink transmission mode 1, UE may report per-packet priority and/or sidelink transmission priority levels and the corresponding UE sidelink TX buffer information to eNodeB using buffer status report signaling and eNodeB utilizes this information to schedule sidelink transmissions from multiple UEs (sidelink transmitters) taking the amount of traffic and priority level into account Example 6 may include the method of example 1 or some other example herein, wherein configurable or adaptive timescales may include eNodeB signaling to enable one of the preemption procedure timescale including fast, mid-fast and slow timescales Example 7 may include the method of example 1 or some other example herein, wherein in case of UE autonomous sidelink transmission mode 2, UE may follow priority handling procedure comprising preemption procedure operating at configurable timescales
  Resource partitioning method
  Probabilistic method
  Monitoring method
  Combination of the above methods Example 8 may include the method of example 7 or some other example herein, wherein resource partitioning methods may include association of the transmission priority levels with the sidelink spectrum resources.

Example 9 may include the method of example 8 or some other example herein, wherein association of transmission priority with sidelink spectrum resources may include:
  Association of different PSCCH and/or PSSCH resource pools with different priority levels
  Association of different sidelink transmission periods of PSSCH and/or PSCCH pools with different priority levels
  Association of T-RPT patterns (or subset of T-RPT patterns within single or multiple PSSCH pools) with different priority levels. The priority level of T-RPT pattern $p_{TRP}=f(I_{TRP})$ may be a function of T-RPT index—$I_{TRP}$.
  Association of different transmission periods of PSCCH and/or PSSCH pools with different priority levels
  Association of pool frequency resources with different priority levels
  Association of different SCI resources ($n_{PSCCH}$) within PSCCH pool (or subsets of SCI resources within PSCCH pool) with different priority levels. For instance, the PSCCH resource priority level $p_R$ may be a function of SCI resource index $n_{PSCCH}$, i.e. $p_R=f(n_{PSCCH})$, e.g. $p_R=\text{mod}(n_{PSCCH}, p_{max})$ or $p_R=\lfloor n_{PSCCH}/p_{max}\rfloor$, where $p_{max}$ is a maximum defined priority.
  Combination of the above rules resulting in mapping priority level to sidelink spectrum resources Example 10 may include the method of example 7 or some other example herein, wherein resource partitioning methods may be configurable by the network min and max resource quota that may be utilized by UE transmitter at the predefined period of time without entering the preemption state in case of competition with UEs having equal transmission priority Example 11 may include the method of example 7 or some other example herein, wherein resource partitioning methods may be configurable by the network min and max resource grant size, that determines the maximum amount of sidelink resources that UE may utilize per SCI period (PSCCH/PSSCH) period in case of no competition. The min resource grant size may determine the minimum amount of sidelink resources that UE may adjust to in case of detected competition for resources but the criteria to release resources is not yet satisfied Example 12 may include the method of example 7 or some other example herein, wherein probabilistic method may include association of the transmission priority levels with the transmission probability on certain sidelink spectrum resources Example 13 may include the method of example 12 or some other example herein, wherein UEs may transmit on subset or all resources of sidelink resource pools (PSCCH/PSSCH) according to the predefined/preconfigured transmission probabilities Example 14 may include the method of example 12 or some other example herein, wherein the transmission probability $P_{TX}$ may vary depending on the amount of resources or data rate used by D2D TX(s) over certain period of time or amount of traffic in the TX buffer for each priority level.

Example 15 may include the method of example 12 or some other example herein, wherein the transmission probability $P_{TX}$ settings may vary over time and depend on the amount of active D2D transmissions, sidelink resource utilization and/or priority level.

Example 16 may include the method of example 7 or some other example herein, wherein monitoring method may include:

Signaling of transmission priority levels by the UE (sidelink transmitters) and monitoring of priority level by other UEs competing for or sharing sidelink resources Preemption procedure Preemption criteria to access sidelink resources Preemption criteria to release sidelink resources Example 17 may include the method of example 16 or some other example herein, wherein signaling of transmission priority levels, may include:

Explicit PSCCH based signaling, based on signaling of the transmission priority over PSCCH resources in SCI Format 0 reusing timing advance indication $I_{TAI}$ field or using new SCI Format X Implicit PSCCH signaling, where PSCCH resource index within PSCCH resource pool is associated with the transmission priority level.

Signaling of priority is done by scrambling PSCCH CRC with priority level.

Example 18 may include the method of example 16 or some other example herein, wherein preemption procedure to enable ProSe per packet priority may define active, preemption and idle states for sidelink transmitters operating in sidelink transmission mode 2, wherein In active state, UEs transmit control and data in the PSCCH/PSSCH channels, sharing sidelink resources and evaluate preemption criteria in order to trigger the procedure for release of resources (PSCCH/PSSCH).

In preemption state, UEs that have data for transmission compete for resources, evaluate the preemption criteria to access sidelink resources and start communication over sidelink channels (e.g. PSCCH/PSSCH pools) entering active state if criterion is satisfied.

In idle state, UEs utilize this state if there is no active sidelink traffic or the preemption time is expected to be long due to ongoing transmissions of higher priority UEs.

Example 19 may include the method of example 16 or some other example herein, wherein preemption criteria to access resources may include:

Medium activity indication measured in terms of the amount of active D2D transmissions $N_{A-TX}$ with equal or higher priority and received power level. The SL-RSRP or SL-RSSI or the received power level from active sidelink transmitters may be evaluated. The value of $N_{A-TX}$ may be configurable by eNodeB and belong to the range from zero to +infinity, depending on the desired priority handling performance.

Resource quota/grant indication, providing information whether the resource quota (e.g. max resource quota) was consumed or not. The D2D TXs that spent their resource quotas release resources, if the pre-configured condition to release resources is satisfied.

Combination of medium activity and resource quota conditions, defining preemption criteria for access to sidelink resources in case of priority handling.

Example 20 may include the method of example 16 or some other example herein, wherein preemption criteria to release resources may include:

Medium activity indication, measured in terms the total number of active sidelink transmitters and candidate sidelink transmitter with equal or higher priority that exceeds the predefined/pre-configured number ($N_{R-TX}$). If condition is met, the UE with lower priority may release transmission resources.

Resource quota/grant indication. Similar to the criteria for access to resources, the resource quota may be used to release resources. The release of resources ensures fair resource usage among UEs with the same priority level. For instance, the UE that spent the resource quota may release resource if the number of D2D TXs (both active and candidate) exceeds the predefined number, i.e. new candidate with the same priority level attempts to access resources.

Combination of medium activity and resource quota conditions, defining criteria for resource release in case of priority handling.

Example 21 may include the method of example 1 or some other example herein, wherein preemption handling with configurable operation timescales may include mechanism of fast pre-emption, mid-fast preemption or slow preemption.

Example 22 may include the method of example 21 or some other example herein, wherein the fast preemption may include time ordered priority mapping to PSCCH resources, so that higher priority transmissions are transmitted first, and lower priority transmissions are suspended if condition to release resources or preemption condition is met.

Example 23 may include the method of example 21 or some other example herein, wherein the mid-fast preemption may include single PSCCH pool for preemption and regular communication procedures.

Example 24 may include the method of example 23 or some other example herein, wherein the preemption cycle may be specified over PSCCH pool resources, which is a multiple of SCI periods (PSCCH) periods and different time instances of PSCCH pool are used for regular sidelink communication or for priority handling/preemption.

Example 25 may include the method of example 23 or some other example herein, wherein the pre-configured subset of PSCCH may pool resources within PSCCH pool used for preemption procedure while another subset for communication.

Example 26 may include the method of example 21 or some other example herein, wherein the mid-fast preemption may include configuration of multiple PSCCH pools associated with PSSCH pool, where different PSCCH pools serve different purpose some of the pools used for preemption and another for communication.

Example 27 may include an apparatus comprising means to perform one or more elements of a method described in or related to any of examples 1-26, or any other method or process described herein.

Example 28 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 29 may include an apparatus comprising logic, modules, and/or circuitry to perform one or more elements of a method described in or related to any of examples 1-26, or any other method or process described herein.

Example 30 may include a method, process, and/or technique as described in any of examples 1-26, or some portion thereof.

Example 31 may include a method of communicating in a wireless network as shown and described herein.

Example 32 may include a system for providing wireless communication as shown and described herein.

Example 33 may include a device for providing wireless communication as shown and described herein.

Clauses

Other features of the embodiments are as set out in the following numbered clauses:

Clause 1. Device-to-device (D2D) communication circuitry, for use in a user equipment (UE) of a wireless communication network, the UE being configured to transmit and receive device-to-device communications, wherein the UE has a protocol stack including a physical layer at a lower stack level and an application layer at a higher stack level, the circuitry comprising:

processing hardware having:

application processing circuitry arranged to a generate packets of data and to assign a per-packet priority to the generated packets in the application layer; and baseband processing circuitry arranged to map the per-packet priority from the application layer to a transmission priority in the physical layer for wireless transmission of data of the data packets in a device-to-device wireless connection with another UE, wherein the transmission priority is used to prioritize access to at least one resource pool comprising a set of physical resource blocks of a Long Term Evolution/Long Term Evolution-Advanced (LTE/LTE-A) uplink allocated to device-to-device communications.

Clause 2. D2D communication circuitry as in clause 1, wherein the mapping comprises one of a one-to-one mapping or a many-to-one mapping.

Clause 3. D2D communication circuitry as in clause 1 or clause 2, wherein the LTE/LTE-A uplink comprises one of a Physical Uplink Control Channel (PUCCH) and a Physical Uplink Shared Channel (PUSCH) and wherein the at least one resource pool corresponds to at least one of a Physical Sidelink Control Channel (PSCCH) and a Physical Sidelink Shared Channel (PSSCH).

Clause 4. D2D communication circuitry as in clause 3, wherein a given transmission priority corresponds to PSCCH resources only, PSSCH resources only, or a combination of PSCCH resources and PSSCH resources.

Clause 5. D2D communication circuitry as in clause 3 or clause 4, wherein the transmission priority is used to select between different transmission periods of at least one of a PSSCH resource pool and a PSSCH resource pool.

Clause 6. D2D communication circuitry as in any one of the preceding clauses, wherein the transmission priority prioritizes access to a plurality of different resource pools allocated to device-to-device communications and wherein different ones of the plurality of different resource pools are associated with different transmission priority values.

Clause 7. D2D communication circuitry of any one of clauses 1 to 6, wherein the device-to-device communication is performed in a mode denoted mode 1, where access to the resource pool is controlled by an eNodeB and wherein the UE is arranged to communicate at least one of the per-packet priority and the transmission priority together with corresponding transmit buffer information to the eNodeB in a Buffer Status Report for use by the eNodeB in scheduling device-to-device wireless connections for a plurality of UEs.

Clause 8. D2D communication circuitry of any one of clauses 1 to 6, wherein the device-to-device communication is performed in a mode denoted mode 2, where the UE autonomously accesses the resource pool without requiring a connection to an eNodeB.

Clause 9. D2D communication circuitry as in clause 8, wherein the at least one resource pool comprises a PSSCH resource pool and wherein the transmission priority level is mapped to a Time Resource Pattern (T-RPT) of the PSSCH resource pool.

Clause 10. D2D communication circuitry as in clause 8, wherein resource pool corresponds to the PSCCH and wherein the transmission priority level is a function of a Sidelink Control Information, SCI, resource index, $n_{PSCCH}$, for the PSCCH.

Clause 11. D2D communication circuitry as in any one clauses 8 to 10, wherein the baseband processing circuitry is arranged to perform transmission of the device-to-device communication using physical resources of an available resource pool allocated according to at least one of:

an exclusive resource allocation wherein UEs having different transmission priorities are allocated with different physical resources for transmission; a shared resource allocation wherein a plurality of different priority levels are mapped to one of: respective ones of the at least one resource pool, different subsets of time resource patterns corresponding to a resource pool for a given device-to-device channel, or different frequency resources corresponding to a resource pool of a given device-to-device channel; or an overlapped resource allocation wherein a set of physical resource blocks of a given resource pool is allocated a first priority level and a subset of the physical resource blocks is allocated a second, different, priority.

Clause 12. D2D communication circuitry as in clause 8, wherein the processing hardware is arranged to allocate resources of the resource pool for the device-to-device communication depending upon at least one of: a maximum quota specifying a maximum amount of physical resources that a UE having the device-to-device communication circuitry is permitted by an eNodeB to use for the device-to-device communication in a predefined time interval; and a minimum quota specifying a minimum amount of physical resources that the UE having the device-to-device communication circuitry is permitted by the eNodeB to use for the device-to-device communication if there is contention for the physical resources and a resource release condition has not been satisfied by the UE.

Clause 13. D2D communication circuitry as in any one of clauses 8 to 12, wherein the processing hardware is arranged to allocate resources of at least one of a PSSCH resource pool and a PSCCH resource pool for the device-to-device communication depending upon a resource grant size specifying a number of physical resources a UE having the device-to-device communication circuitry is permitted to utilize in a Sidelink Control Information (SCI) period.

Clause 14. D2D communication circuitry as in any one of clauses 8 to 13, wherein the baseband circuitry is configured to transmit data of the data packets in the at least one resource pool depending upon a plurality of preconfigured transmission probability values, $P_{TX}$, and wherein the transmission probability values are mapped to at least one of the per-packet priority and the transmission priority.

Clause 15. D2D communication circuitry as in clause 14, wherein the processing hardware is arranged to set the transmission probability $P_{TX}$ depending upon at least one of: a number of physical resources used by a UE incorporating the device-to-device communication circuitry for device-to-device transmissions in a predetermined time interval; a data rate used by the UE for device-to-device transmissions in a predetermined time interval; and an amount of traffic in a transmit buffer of the UE for each of a plurality of transmission priority values.

Clause 16. D2D communication circuitry as in clause 14 or clause 15, wherein the preconfigured transmission probability values, $P_{TX}$, are dynamically varied with time depending upon at least on of: a number of active device-to-device transmissions; a utilization level of the at least one resource pool; and the transmission priority.

Clause 17. D2D communication circuitry as in any one of clauses 8 to 16, wherein the processing hardware is arranged to implement a preemption procedure to prioritize transmission of data of the data packets, the preemption procedure being such that a UE having the D2D communication circuitry is arranged to transition between an active state, a preemption state and an idle state depending upon respective transition criteria.

Clause 18. D2D communication circuitry as clause in clause 17, wherein in the active state comprises transmitting data in at least one of a PSCCH resource pool and a PSSCH resource pool.

Clause 19. D2D communication circuitry as in clause 17 or clause 18, wherein in the preemption state, processing hardware is arranged to evaluate at least one pre-emption criterion to access the at least on resource pool when the UE has data intended for device-to-device transmission and wherein the UE transitions to the active state depending upon if preemption criteria have been satisfied.

Clause 20. D2D communication circuitry as in any one of clauses 17 to 19, wherein the processing hardware is arranged when in the preemption state to monitor device-to-device transmissions of active UEs and optionally to monitor transmissions of UEs in the preemption state.

Clause 21. D2D communication circuitry as in any one of clauses 17 to 20, wherein in the idle state the UE has no device-to-device data to transmit and upon arrival of device-to-device communication data in a buffer, the UE is arranged to transition to the preemption state.

Clause 22. D2D communication circuitry as in any one of clauses 17 to 21, wherein the processing hardware implements at least one of the following pre-emption criteria to access resources: monitoring spectrum of the wireless communication network to determine a number of device-to-device transmissions from other UEs in an active state having a transmission priority value greater than or equal to a pre-configured threshold value $N_{A-TX}$ as a condition to access resources of the at least one resource pool; monitoring resource quota utilization by determining whether or not at least one other UE has consumed its resource quota in a given time interval and identifying other UEs that have already spent their resource quotas as candidates for transitioning to the preemption state; or triggering release of resources by the UE depending upon a preemption metric, the preemption metric taking account of the number of higher priority transmissions, the resource quota utilization and the transmission priority level for the UE.

Clause 23. D2D communication circuitry as in clause 22, wherein the processing hardware implements the pre-emption criteria to access resources using the spectrum monitoring criterion for other device-to-device transmissions and wherein the UE is arranged to measure at least one of a sidelink reference signal received power (SL-RSRP) or a sidelink received strength (SL-RSSI) of detected device-to-device transmissions for use in determining the pre-emption criteria to access the resources.

Clause 24. D2D communication circuitry as in any one of clauses 17 to 23, wherein the processing hardware implements at least one of the following pre-emption criteria to release resources: monitors spectrum of the wireless communication network to determine if a total number of other UEs in the active state and other UEs in the preemption state exceeds a threshold value $N_{R-TX}$ and causes the UE to release resources if the threshold $N_{R-TX}$ is exceeded; or the UE is arranged to release resources to a UE in the preemption state at the same priority level if the UE is determined to have consumed a resource quota allocated to it in a given time interval and if the total number of other UEs in the active state and other UEs in the preemption state exceeds a threshold value $N_{R-TX}$.

Clause 25. D2D communication circuitry as in any one of clauses 8 to 24, wherein the processing hardware is configured to transmit an indication of the transmission priority corresponding to a transmitted device-to-device communication signal using one of: at least a subset of bits of a Sidelink Control Information (SCI) Format field of the Physical Sidelink Control Channel (PSCCH) where the at least one resource pool is a PSCCH resource pool; a derivation of the transmission priority level based upon a PSCCH resource index where the at least one resource pool is a PSCCH resource pool; or a cyclic redundancy check (CRC) for data of the device-to-device transmission of a PSCCH transmission scrambled with the transmission priority level.

Clause 26. D2D communication circuitry as in any one of the preceding clauses, wherein the processing hardware is arranged to receive from an eNodeB via Radio Resource Control layer signaling, at least one of: a maximum resource quota specifying a maximum number of physical resource block of the resource pool permitted for use in a given time period; a minimum resource quota specifying a minimum number of physical resource blocks of the resource pool permitted for use in a given time period; or a resource grant setting providing at least one of a maximum resource or a minimum resource for use in the device-to-device communications of a UE having the D2D communication circuitry in a single Sidelink Control Information, SCI, period.

Clause 27. D2D communication circuitry as in clause 26, wherein at least one of the maximum resource quota, the minimum resource quota or the resource grant setting are broadcast in a System Information Block 18 (SIB 18).

Clause 28. D2D communication circuitry as in any one of the preceding clauses, wherein, the processing hardware is arranged to determine a current usage of physical resources of the at least one resource pool by receiving a PSCCH communication and arranging to calculate, based on the transmission priority of a pending D2D communication and the determined current physical resource usage, a transmission probability for a pending D2D communication.

Clause 29. D2D communication circuitry as in clause 28, wherein the processing hardware is arranged to calculate the transmission probability for the pending D2D communication one of: upon arrival of data for D2D transmission in an empty buffer; periodically; or after a predetermined time following a decision not to start transmitting based upon a value of the calculated transmission probability.

Clause 30. D2D communication circuitry as in clause 17, wherein the processing hardware is arranged to select between a plurality of different timescales for preemption of data transmission when a UE having the D2D communication circuitry is in the preemption state, the plurality of different timescales comprising a fast preemption timescale, a mid-fast preemption timescale and a slow preemption timescale and wherein the fast preemption timescale is up to hundreds of milliseconds and the slow preemption timescale is an order of seconds.

Clause 31. D2D communication circuitry as in clause 30, wherein when the fast preemption timescale is selected and the at least one resource pool comprises a PSCCH resource pool, physical resource blocks of the PSCCH resource pool are divided into a plurality of different priority levels depending upon the assigned transmission priority.

Clause 32. D2D communication circuitry as in clause 30, wherein a mapping between the PSCCH resources and the transmission priorities is a time-ordered priority mapping in which preemptive status transmissions having higher priority access are preferentially made active status transmissions before transmissions having lower priority access.

Clause 33. D2D communication circuitry as in any one of clauses 30 to 32, wherein when the mid-fast preemption timescale is selected dedicated PSCCH resources are allocated for use in a preemption procedure.

Clause 34. D2D communication circuitry as in any one of clauses 30 to 33, wherein the PSCCH resource pool is allocated periodically according to a Sidelink Control Information, SCI, period and wherein a subset instances of the PSCCH pool in a preemption period comprising a plurality of SCI periods is dedicated to resource preemption with a complementary subset of instances of the PSCCH pool being dedicated to D2D communications.

Clause 35. D2D communication circuitry as in any one of clauses 30 to 33, wherein the PSCCH resource pool is allocated periodically according to a Sidelink Control Information, SCI, period and wherein a non-zero subset of the PSCCH pool in each SCI period is dedicated to resource preemption.

Clause 36. D2D communication circuitry as in any one of clauses 30 to 33, wherein two PSCCH resource pools are allocated periodically and wherein a first of the two PSCCH resource pools is allocated at a first periodicity of an SCI period and is dedicated to D2D communication and a second of the two PSCCH resource pools is allocated at a preemption periodicity of a plurality of SCI periods and is dedicated to resource preemption.

Clause 37. D2D communication circuitry as in any one of clauses 30 to 33, wherein a single PSCCH pool is allocated periodically according to an SCI period and wherein the device-to-device communication circuitry is arranged to monitor physical resource usage in the PSCCH pool prior to starting transmission, to determine a probability to commence transmission based upon the monitored resource usage and to start transmission in a subsequent SCI period depending upon the determined probability.

Clause 38. D2D communication circuitry as in clause 37, wherein the transmission once started is permitted to continue for up to a preemption period whereupon the transmission probability is re-determined.

Clause 39. Device-to-device communication circuitry as in any one of the preceding clauses, wherein the processing hardware is configured to receive from an eNodeB at least one of a maximum resource amount and a minimum resource amount of one of the at least one resource pools that can be used in a given time period for a given device-to-device communication by a UE incorporating the device-to-device communication circuitry and wherein the processing hardware of the device-to-device communication circuitry is arranged to send a quota utilization signal to the eNodeB indicating a portion of the allocated resource quota that has been used at the time the quota utilization signal is sent.

Clause 40. A user equipment (UE) comprising the D2D communication circuitry of any one of clauses 1 to 39.

Clause 41. A user equipment (UE) for use in a wireless communication network, the UE being configured to transmit and receive device-to-device communications, wherein the UE has a protocol stack including a physical layer at a lower stack level and an application layer at a higher stack level, the UE comprising:

a touchscreen configured to receive input from a user for processing by the UE;

application processing circuitry arranged to a generate packets of data and to allocate a packet priority level to each of the generated packets in the application layer;

baseband processing circuitry arranged to convert the packet priority level to a transmission priority level in the physical layer, wherein the transmission priority level is used to prioritize access to at least one resource pool comprising a set of physical resource blocks of an Long Term Evolution/Long Term Evolution-Advanced (LTE/LTE-A) uplink configured for allocation to device-to-device communications; and radio frequency circuitry arranged to up-convert in frequency, baseband signals provided by the baseband circuitry and to provide radio frequency output signals for transmission.

Clause 42. Device-to-device (D2D) communication circuitry, for use in a user equipment (UE) of a wireless communication network, the UE being configured to transmit and receive device-to-device communications, wherein the UE has a protocol stack including a physical layer at a lower stack level and an application layer at a higher stack level, the circuitry comprising:

means for generating packets of data and for assigning a per-packet priority to the generated packets in the application layer;

means for mapping the per-packet priority from the application layer to a transmission priority in the physical layer for wireless transmission of data of the data packets in a device-to-device wireless connection with another UE, wherein the transmission priority is used to prioritize access to at least one resource pool comprising a set of physical resource blocks of an Long Term Evolution/Long Term Evolution-Advanced (LTE/LTE-A) uplink, the resource pool being allocated to device-to-device communications.

Clause 43. A computer program embodied on a computer readable medium, the computer program comprising:

program instructions for generating, in an application layer of a user equipment protocol stack, packets of data for transmission in a device-to-device communication wherein the data packets are generated with a corresponding packet priority;

program instructions for mapping the packet transmission priority from the application layer to a transmission priority in a physical layer of the user equipment protocol stack for wireless transmission of data of the data packets in a device-to-device wireless connection with another UE, wherein the transmission priority is used to prioritize access to at least one resource pool comprising a predetermined portion of physical resource blocks of an Long Term Evolution/Long Term Evolution-Advanced (LTE/LTE-A) uplink allocated to device-to-device communications.

Clause 44. Resource configuring circuitry for use in an eNodeB of a wireless communication network, the resource configuring circuitry being arranged to:

allocate at least one pool of Long Term Evolution/Long Term Evolution-Advanced (LTE/LTE-A) uplink resources to device-to-device communication between UEs of the communication network;

receive from at least one UE, priority information corresponding to a device-to-device communication to be transmitted by the UE;

configure, depending upon the priority information, a resource quota for use by the UE for performing the device-to-device communication;

signal to the UE, the configured resource quota.

Clause 45. The resource configuring circuitry as in clause 44, wherein the resource quota is one of a maximum resource quota or a minimum resource quota.

Clause 46. The resource configuring circuitry as in clause 44 or clause 45, wherein the eNodeB is arranged to configure a resource grant setting to control at least one of a maximum resource amount or a minimum resource amount permitted for use in a given time period by the UE for performing the device-to-device communication depending upon the received priority information.

Clause 47. An eNode B for controlling user equipments (UEs) in a wireless communication network, the eNodeB comprising the resource configuring circuitry of any one of clauses 44 to 46.

Clause 48. A method of determining a priority in device to device communication, the method comprising:

generating, in an application layer of a user equipment protocol stack, packets of data for transmission in a device-to-device communication wherein the data packets are generated with a corresponding packet priority; and mapping the packet transmission priority from the application layer to a transmission priority in a physical layer of the user equipment protocol stack for wireless transmission of data of the data packets in a device-to-device wireless connection with another UE, wherein the transmission priority is used to prioritize access to at least one resource pool comprising a predetermined portion of physical resource blocks of a Long Term Evolution/Long Term Evolution-Advanced (LTE/LTE-A) uplink allocated to device-to-device communications.

Clause 49. Method of configuring resources in an eNodeB of a wireless communication network, the method comprising:

allocating at least one pool of Long Term Evolution/Long Term Evolution-Advanced (LTE/LTE-A) uplink resources to device-to-device communication between UEs of the communication network;

receiving from at least one UE, priority information corresponding to a device-to-device communication to be transmitted by the UE;

configuring, depending upon the priority information, a resource quota for use by the UE for performing the device-to-device communication; and signaling to the UE, the configured resource quota.

Clause 50. Method of transmitting device-to-device communications in a user equipment (UE) of a wireless communication network, wherein the UE has a protocol stack including a physical layer at a lower stack level and an application layer at a higher stack level, the method comprising:

generating packets of data and to assign a per-packet priority to the generated packets in the application layer; and mapping the per-packet priority from the application layer to a transmission priority in the physical layer for wireless transmission of data of the data packets in a device-to-device wireless connection with another UE, wherein the transmission priority is used to prioritize access to at least one resource pool comprising a set of physical resource blocks of a Long Term Evolution/Long Term Evolution-Advanced (LTE/LTE-A) uplink allocated to device-to-device communications.

The invention claimed is:

1. One or more non-transitory, computer-readable media (NTCRM) having instructions that, when executed by one or more processors of a user equipment (UE), cause the UE to:

process a configuration message received from an access node to identify an information element that is to associate a priority with a pool of transmission resources to be used by the UE for sidelink communications, wherein the priority is a first priority; and cause a physical layer of a protocol stack of the UE to transmit a sidelink communication in the pool of transmission resources based on the priority, wherein to cause the physical layer to transmit the sidelink communications, the UE is to:

generate information associated with a second priority;

map the second priority to the first priority;

encode the sidelink communication with the information associated with the second priority; and transmit the sidelink communication in the pool of transmission resources based on mapping of the second priority to the first priority.

2. The one or more NTCRM of claim 1, wherein the instructions, when executed, further cause the UE to:

autonomously select the pool of transmission resources for transmission of the sidelink communications.

3. The one or more NTCRM of claim 1, wherein the pool of transmission resources is a physical sidelink shared channel pool and the sidelink communications is to include data to be transmitted to another UE.

4. The one or more NTCRM of claim 1, wherein the pool of transmission resources is a physical sidelink control channel pool and the sidelink communications is to include sidelink control information to be transmitted to another UE.

5. The one or more NTCRM of claim 1, wherein the information element is to associate the priority with a sidelink transmission period in which a plurality of pools of transmission resources, including the pool of transmission resources, are located.

6. The one or more NTCRM of claim 1, wherein the pool of transmission resources include resources having a time-resource pattern of transmission (T-RPT) pattern.

7. The one or more NTCRM of claim 1, wherein the pool of transmission resources include resources having a subset of time-resource pattern of transmission (T-RPT) patterns within one or more physical sidelink shared channel pools.

8. The one or more NTCRM of claim 1, wherein the pool of transmission resources include sidelink control information resources within a physical sidelink control channel pool.

9. The one or more NTCRM of claim 1, wherein the priority is selected from eight priority values.

10. One or more non-transitory, computer-readable media (NTCRM) having instructions that, when executed by one or more processors of an access node (AN), cause the AN to:
generate a configuration message with an information element that is to associate a priority with a pool of transmission resources to be used by a user equipment (UE) for sidelink communications;
cause a physical layer of a protocol stack of the AN to transmit a downlink communication to the UE with the configuration message;
receive, from the UE, information on status of one or more buffers that respectively corresponds to one or more priority levels;
generate scheduling information to schedule a sidelink communication of the UE based on the status of the one or more buffers; and
transmit, to the UE, an indication of the schedule.

11. The one or more NTCRM of claim 10, wherein the instructions, when executed, further cause the AN to: select the priority from eight priority values.

12. The one or more NTCRM of claim 10, wherein the pool of transmission resources is a physical sidelink shared channel pool and the sidelink communications is to include data to be transmitted to another UE.

13. The one or more NTCRM of claim 10, wherein the pool of transmission resources is a physical sidelink control channel pool and the sidelink communications is to include sidelink control information to be transmitted to another UE.

14. The one or more NTCRM of claim 10, wherein the pool of transmission resources include sidelink control information resources within a physical sidelink control channel pool.

15. A processor for a user equipment (UE) in a communications network, the processor comprising:
circuitry to execute one or more instructions that, when executed, cause the processor to perform operations comprising:
receiving, from an access node in the communications network, a configuration message with an information element including information associating a priority with a pool of transmission resources used by the UE for sidelink communications;
determining status of one or more buffers that correspond to one or more priority levels;
transmitting, to the access node, information on the status of the one or more buffers; and
receive, from the access node, scheduling information to schedule a sidelink communication of the UE, the scheduling information generated based on the status of the one or more buffers.

16. The processor of claim 15, wherein the pool of transmission resources includes a physical sidelink control channel pool and the sidelink communications is to include sidelink control information to be transmitted to another UE.

17. The processor of claim 15, wherein the pool of transmission resources includes resources having a time-resource pattern of transmission (T-RPT) pattern.

18. The processor of claim 15, wherein the pool of transmission resources includes sidelink control information resources within a physical sidelink control channel pool.

19. The processor of claim 15, wherein the instructions, when executed, further cause the processor to perform operations comprising:
autonomously selecting the pool of transmission resources for transmission of the sidelink communications.

20. The processor of claim 15, wherein the pool of transmission resources includes a physical sidelink shared channel pool and the sidelink communications is to include data to be transmitted to another UE.

* * * * *